(12) United States Patent
Yang et al.

(10) Patent No.: US 12,722,615 B2
(45) Date of Patent: Sep. 1, 2026

(54) HYDRAULIC ADJUSTMENT UNIT, BRAKE SYSTEM, AND CONTROL METHOD

(71) Applicant: YINWANG INTELLIGENT TECHNOLOGIES CO., LTD., Shenzhen (CN)

(72) Inventors: Weimiao Yang, Shanghai (CN); Yongsheng Zhang, Shanghai (CN); Biao Jin, Shanghai (CN); Wei Zhang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 922 days.

(21) Appl. No.: 17/985,347

(22) Filed: Nov. 11, 2022

(65) Prior Publication Data

US 2023/0077277 A1 Mar. 9, 2023

Related U.S. Application Data

(63) Continuation of application No. PCT/CN2020/090089, filed on May 13, 2020.

(51) Int. Cl.
*B60T 13/68* (2006.01)
*B60T 7/12* (2006.01)
(Continued)

(52) U.S. Cl.
CPC .............. *B60T 13/686* (2013.01); *B60T 7/12* (2013.01); *B60T 8/94* (2013.01); *B60T 13/168* (2013.01);
(Continued)

(58) Field of Classification Search
None
See application file for complete search history.

(56) References Cited

U.S. PATENT DOCUMENTS 4,534,172 A 8/1985 Price et al.
8,888,197 B2 11/2014 Miyazaki et al.
(Continued)

FOREIGN PATENT DOCUMENTS

CN 105398433 A 3/2016
CN 106762888 A 5/2017
(Continued)

OTHER PUBLICATIONS

Xie et al., "Calculation and Analysis for Brake Pedal Stroke," China Academic Journal Electronic Publishing House, Oct. 28, 2013, 4 pages (with English abstract ).
(Continued)

*Primary Examiner* — Melanie Torres Williams
(74) *Attorney, Agent, or Firm* — Fish & Richardson P.C.

(57) ABSTRACT

This application provides a hydraulic adjustment unit, a brake system, an automobile, and a control method, to individually pressurize any brake pipe in a dual circuit brake pipe, to improve safety of a dual circuit brake system. This application is applicable to an intelligent car, a new energy car, a conventional car, or the like. In embodiments of this application, a second hydraulic chamber provides a braking force for a first group of brake wheel cylinders and through a first brake pipe provided with a first control valve, and provides a braking force for a second group of brake wheel cylinders and through a second brake pipe provided with a second control valve.

18 Claims, 13 Drawing Sheets

(51) Int. Cl.

| | |
|---|---|
| ***B60T 8/94*** | (2006.01) |
| ***B60T 13/16*** | (2006.01) |
| ***B60T 13/74*** | (2006.01) |
| ***B60T 17/04*** | (2006.01) |
| ***B60T 17/08*** | (2006.01) |
| *B60T 13/14* | (2006.01) |

(52) U.S. Cl.
CPC ............ *B60T 13/745* (2013.01); *B60T 17/04* (2013.01); *B60T 17/08* (2013.01); *B60T 13/142* (2013.01); *B60T 2270/402* (2013.01); *B60T 2270/403* (2013.01)

(56) References Cited

U.S. PATENT DOCUMENTS

| | | | | |
|---|---|---|---|---|
| 10,077,036 | B2 | 9/2018 | Kim et al. | |
| 2019/0092301 | A1 | 3/2019 | Jeong et al. | |
| 2019/0100186 | A1* | 4/2019 | Jeong | B60T 13/145 |
| 2019/0275997 | A1 | 9/2019 | Park | |

FOREIGN PATENT DOCUMENTS

| | | | |
|---|---|---|---|
| CN | 108394392 | A | 8/2018 |
| CN | 108928334 | A | 12/2018 |
| CN | 109562749 | A | 4/2019 |
| CN | 109572650 | A | 4/2019 |
| CN | 109591811 | A | 4/2019 |
| CN | 110562225 | A | 12/2019 |
| CN | 110758365 | A | 2/2020 |
| DE | 10244375 | A1 | 1/2004 |
| DE | 102012221146 | A1 | 5/2014 |
| EP | 3501926 | A1 | 6/2019 |
| KR | 102021465 | B1 | 9/2019 |
| WO | 2014045382 | A1 | 3/2014 |

OTHER PUBLICATIONS

Office Action in Chinese Appln. No. 202080004512.9, dated Nov. 16, 2021, 6 pages (with English translation).

Office Action in Chinese Appln. No. 202080004512.9, dated Jun. 28, 2021, 13 pages (with English translation).

Search Report in Chinese Appln. No. 202080004512.9, mailed on Jun. 23, 2021, 3 pages.

International Search Report and Written Opinion in International Appln. No. PCT/CN2020/090089, mailed on Feb. 5, 2021, 20 pages (with English translation).

Extended European Search Report in European Appln No. 20935487.7, dated May 30, 2023, 8 pages.

* cited by examiner

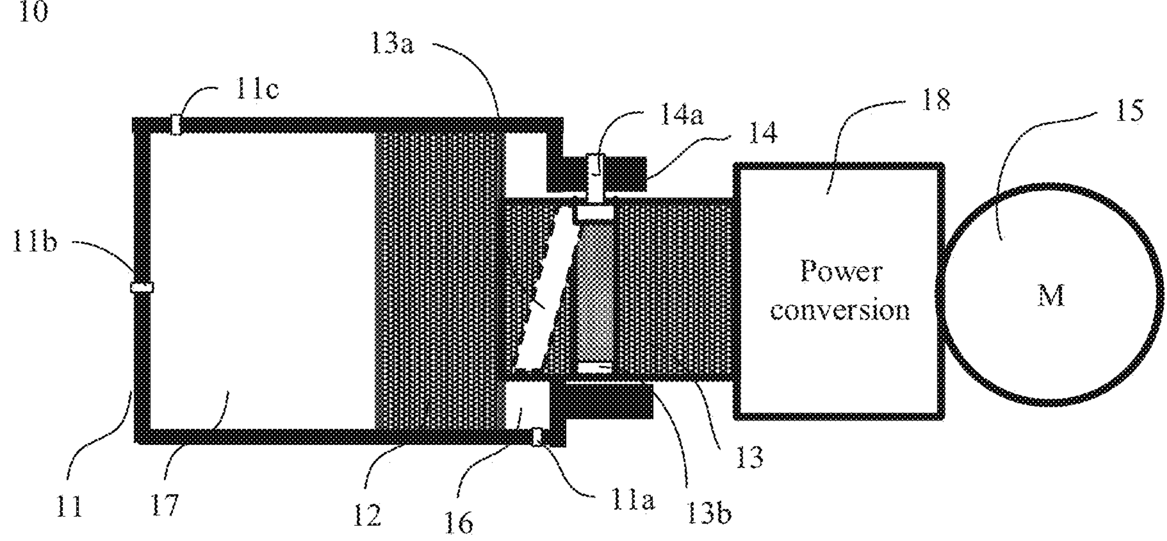
FIG. 1
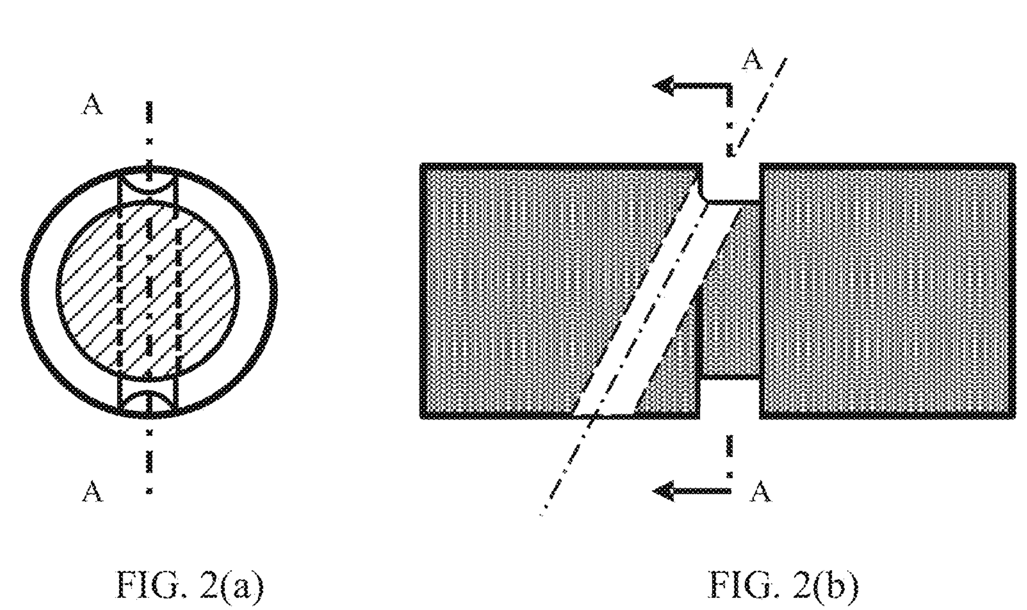
FIG. 2(a)
FIG. 2(b)

Figure 12:
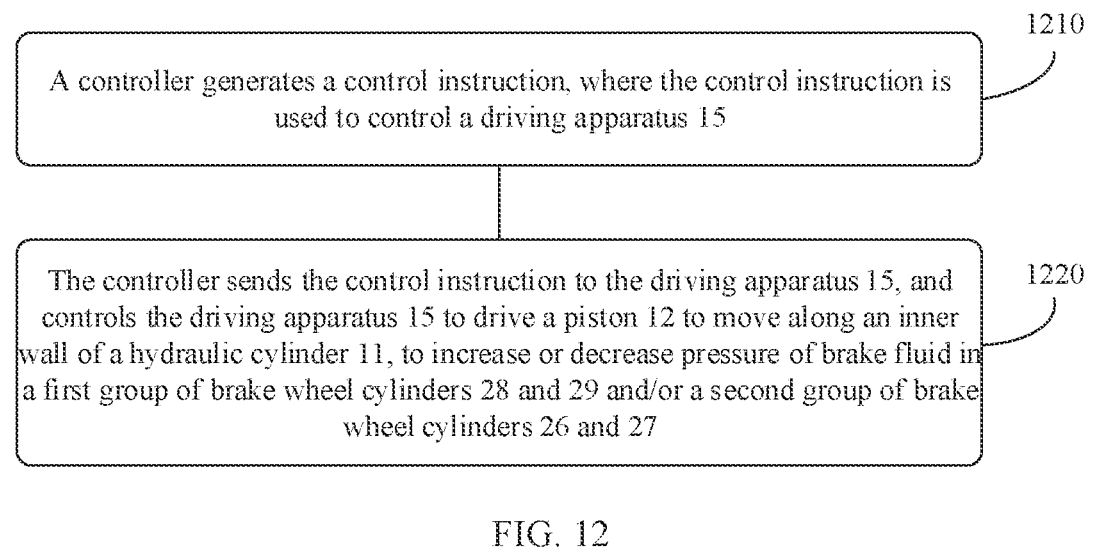

A controller generates a control instruction, where the control instruction is used to control a driving apparatus 15

1210

The controller sends the control instruction to the driving apparatus 15, and controls the driving apparatus 15 to drive a piston 12 to move along an inner wall of a hydraulic cylinder 11, to increase or decrease pressure of brake fluid in a first group of brake wheel cylinders 28 and 29 and/or a second group of brake wheel cylinders 26 and 27

HYDRAULIC ADJUSTMENT UNIT, BRAKE SYSTEM, AND CONTROL METHOD

CROSS-REFERENCE TO RELATED APPLICATIONS

This application is a continuation of International Application No. PCT/CN2020/090089, filed on May 13, 2020, the disclosure of which is hereby incorporated by reference in its entirety.

TECHNICAL FIELD

This application relates to the field of automobiles, and more specifically, to a hydraulic adjustment unit, a brake system, and a control method.

BACKGROUND

A brake system of an automobile is a system that applies specific braking force to wheels of the automobile to perform forced braking on the automobile to some extent. The brake system functions to make a driving automobile forcibly decelerate or even stop as required by a driver or a controller, or to make a stopped automobile stably parked under various road conditions (for example, on a ramp), or to make an automobile driven downhill at a stable speed.

As a popular brake system, an electro-hydraulic brake (Electro-Hydraulic Brake, EHB) system usually includes a dual circuit brake system and a distributed brake system. For the dual circuit brake system, a hydraulic adjustment apparatus is used to provide a braking force for a first group of brake wheel cylinders through a first brake pipe, and the hydraulic adjustment apparatus is used to provide a braking force for a second group of brake wheel cylinders through a second brake pipe. At present, a hydraulic adjustment apparatus with a bidirectional pressurization function is used as the hydraulic adjustment apparatus in the foregoing dual circuit brake system.

In a conventional dual circuit brake system, in a process of forward pressurization of a hydraulic adjustment apparatus with a bidirectional pressurization function, a second hydraulic chamber of the hydraulic adjustment apparatus provides a braking force for a first group of vehicles through a first brake pipe provided with a one-way valve, and the second hydraulic chamber provides a braking force for a second group of vehicles through a second brake pipe provided with a one-way valve. In a process of reverse pressurization, a first hydraulic chamber of the hydraulic adjustment apparatus provides a braking force for the first group of vehicle through the first brake pipe provided with the one-way valve, and the first hydraulic chamber provides a braking force for the second group of vehicle through the second brake pipe provided with the one-way valve.

However, the first brake pipe and the second brake pipe each control a flow direction of brake fluid based on the one-way valve, and cannot control closing or opening of the brake pipe. Consequently, when one of the brake pipes leaks, the brake fluid in the brake system may be lost along the leaked brake pipes, causing the hydraulic adjustment unit to be incapable of pressurizing the brake system, reducing driving safely of the vehicle.

SUMMARY

This application provides a hydraulic adjustment unit, a brake system, and a control method, to individually pressurize any brake pipe in a dual circuit brake pipe, to improve driving safety of a vehicle.

According to a first aspect, a hydraulic adjustment unit in a brake system is provided, including a hydraulic adjustment apparatus 10. The hydraulic adjustment apparatus 10 includes a first hydraulic chamber 16 and a second hydraulic chamber 17. The second hydraulic chamber 17 is connected to a first brake pipe 110 in the brake system and a second brake pipe 120 in the brake system. The first brake pipe 110 is used to provide a braking force for a first group of brake wheel cylinders 28 and 29 in the brake system. The second brake pipe 120 is used to provide a braking force for a second group of brake wheel cylinders 26 and 27 in the brake system. The first brake pipe 110 is provided with a first control valve 111. A closed-open status of the first control valve 111 controls a closed-open status of the first brake pipe 110. The second brake pipe 120 is provided with a second control valve 121. A closed-open status of the second control valve 121 controls a closed-open status of the second brake pipe 120. The first hydraulic chamber 16 is connected to the second brake pipe 120 through a third brake pipe 130 in the brake system. The first hydraulic chamber 16 provides a braking force for the second group of brake wheel cylinders 26 and 27 through the second brake pipe 120. When both the first control valve 111 and the second control valve 121 are in a closed state, the third brake pipe 130 is in communication with the first brake pipe 110 through the second brake pipe 120. The first hydraulic chamber 16 provides a braking force for the first group of brake wheel cylinders 28 and 29 through the first brake pipe 110.

In this embodiment of this application, the second hydraulic chamber 17 provides the braking, force for the first group of brake wheel cylinders 28 and 29 through the first brake pipe 110 provided with the first control valve 111, and provides the braking force for the second group of brake wheel cylinders 26 and 27 through the second brake pipe 120 provided with the second control valve 121, thereby helping individually pressurize the first brake pipe 110 and the second brake pipe 120, and avoiding a prior-art case in which the closed-open status of the first brake pipe 110 and that of the second brake pipe 120 cannot be controlled when the braking forces are provided for the first group of brake wheel cylinders 28 and 29 and the second group of brake wheel cylinders 26 and 27 through the first brake pipe 110 and the second brake pipe 120 with one-way valves.

In addition, the second hydraulic chamber 17 may reuse the first brake pipe 110 provided with the first control valve 111 and the second brake pipe 120 provided with the second control valve 121 to determine whether to provide the braking force for the second group of brake wheel cylinders 26 and 27, thereby helping reduce a quantity of control valves in the brake system and reduce costs of the brake system.

Optionally, the hydraulic adjustment apparatus 10 is a hydraulic adjustment apparatus with a bidirectional pressurization function.

In a possible implementation, the second hydraulic chamber 17 is connected to a first end of the fourth brake pipe 140, a second end of the fourth brake pipe 140 is connected to a first end of the second control valve 121, and an interface between the third brake pipe 130 and the second brake pipe 120 is connected to a second end of the second control valve 121.

In this embodiment of this application, the second hydraulic chamber 17 provides the braking force for the first group of brake wheel cylinders 28 and 29 through the first brake pipe 110 provided with the first control valve 111, and provides the braking force for the second group of brake wheel cylinders 26 and 27 through the second brake pipe 120 provided with the second control valve 121, thereby helping individually pressurize the first brake pipe 110 and the second brake pipe 120.

In a possible implementation, a second end of the first control valve 111 is connected to the second end of the second control valve 121 by using a third control valve 141. The third control valve 141 controls connection or disconnection between the second end of the second control valve 121 and the second end of the first control valve 111.

In this embodiment of this application, the third control valve 141 is disposed between the second end of the first control valve 111 and the second end of the second control valve 121. When the third control valve 141 is in a closed state, pressure balance of the brake fluid between the first brake pipe 110 in which the first control valve 111 is located and the second brake pipe 120 in which the second control valve 121 is located helps improve braking safely of the brake system.

In a possible implementation, a first one-way valve 122 is disposed between a first interface of the hydraulic adjustment unit and a second interface of the hydraulic adjustment unit. The first interface is an interface between the third brake pipe 130 and the second brake pipe 120. The second interface is an interface between the third control valve 141 and the second brake pipe 120. The first one-way valve 122 allows the brake fluid to flow from the first interface to the second interface, and the first one-way valve 122 prevents the brake fluid from flowing from the second interface to the first interface.

In this embodiment of this application, the first one-way valve 122 is disposed between the first interface and the second interface, to allow the brake fluid to flow from the first interface to the second interface, and the first one-way valve 122 prevents the brake fluid from flowing from the second interface to the first interface, thereby helping improve braking efficiency of the first hydraulic chamber 16.

In a possible implementation, the fourth brake pipe 140 is provided with a fourth control valve 142, and closing or opening of the fourth control valve 142 controls closing or opening of the fourth brake pipe 140.

In this embodiment of this application, the fourth brake pipe 140 is provided with the fourth control valve 142, to control the closing or opening of the fourth brake pipe 140 through the closing or opening of the fourth control valve 142. In this way, in a process in which the first hydraulic chamber 16 provides the braking force, the brake fluid is prevented from flowing into the second hydraulic chamber 17 through the fourth brake pipe, thereby helping improve braking efficiency of the first hydraulic chamber 16.

In a possible implementation, the third brake pipe 130 is provided with a fifth control valve 131, and the fifth control valve 131 controls closing or opening of the third brake pipe 130.

In this embodiment of this application, the third brake pipe is provided with the fifth control valve 131, so that the first hydraulic chamber 16 can provide individual braking for the first brake pipe 110 and the second brake pipe 120 through closing or opening of the fifth control valve 131, thereby helping improve driving safety of a vehicle.

In a possible implementation, the first hydraulic chamber 16 and the second hydraulic chamber 17 are formed by dividing a hydraulic cylinder 11 in the hydraulic adjustment unit by using a piston 12 in the hydraulic adjustment unit. An end portion of the first hydraulic chamber 16 is provided with a push rod support portion 14. The push rod support portion 14 supports a push rod 13 for driving the piston 12 to move, and the push rod support portion 14 is provided with a first hydraulic adjustment port 14a. The first hydraulic adjustment port 14a is connected to a first outlet pipe 190 of the brake system. The push rod 13 is provided with a second hydraulic adjustment port 13a. The second hydraulic adjustment port 13a is in communication with the first hydraulic chamber 16. When the piston 12 is located at an inner stop point of a piston stroke, the first hydraulic adjustment port 14a is in communication with the second hydraulic adjustment port 13a, and brake fluid in the first hydraulic chamber 16 is discharged from the first hydraulic chamber 16 through the first outlet pipe 180. When the piston 12 is located at a position in the piston stroke other than the inner stop point, the first hydraulic adjustment port 14a is not in communication with the second hydraulic adjustment port 13a.

In this embodiment of this application, the outlet pipe of the first hydraulic chamber 16 is arranged on the push rod support portion 14 (corresponding to the first hydraulic adjustment port 14a) and the push rod 13 (corresponding to the second hydraulic adjustment port 13a) in sections, so that when the piston 12 is located at the inner stop point of the piston stroke, the first hydraulic adjustment port 14a is in communication with the second hydraulic adjustment port 13a, and when the piston 12 is located at the position in the piston stroke other than the inner stop point, the first hydraulic adjustment port 14a is not in communication with the second hydraulic adjustment port 13a. That is, a state of connection or disconnection between the first hydraulic adjustment port 14a and the second hydraulic adjustment port 13a is controlled by the position of the piston 12 in the piston stroke, thereby avoiding a case of specially configuring a control valve for the first hydraulic chamber 16 in a conventional hydraulic adjustment apparatus to control closing or opening of the outlet pipe of the first hydraulic chamber 16, and helping reduce a quantity of control valves in the hydraulic adjustment unit and reduce costs in the hydraulic adjustment unit.

In a possible implementation, the first hydraulic chamber 16 is connected to a first inlet pipe 190, and the first inlet pipe 190 is configured to press brake fluid in the hydraulic adjustment unit into the first hydraulic chamber 16.

In a possible implementation, when the piston 12 is located at an inner stop point of a piston stroke, the brake fluid in the first hydraulic chamber 16 is discharged from the first hydraulic chamber 16 through the first hydraulic adjustment port 14a and the second hydraulic adjustment port 13a that are in communication with each other.

In this embodiment of this application, the outlet pipe of the first hydraulic chamber 16 is arranged on the push rod support portion 14 (corresponding to the first hydraulic adjustment port 14a) and the push rod 13 (corresponding to the second hydraulic adjustment port 13a) in sections, so that when the piston 12 is located at the inner stop point of the piston stroke, the first hydraulic adjustment port 14a is in communication with the second hydraulic adjustment port 13a, and the brake fluid in the first hydraulic chamber 16 can be discharged from the first hydraulic chamber 16 through the first hydraulic adjustment port 14a and the second hydraulic adjustment port 13a that are in communication with each other, thereby helping reduce a quantity of control valves in the hydraulic adjustment unit and reduce costs in the hydraulic adjustment unit.

In a possible implementation, a circular or semi-circular first flow guide groove 13b is provided along an outer circumference of the push rod 13, and the first flow guide groove 13b is in communication with the second hydraulic adjustment port 13a.

In this embodiment of this application, the circular or semi-circular first flow guide groove 13*b* is provided on the outer circumference of the push rod 13, the piston 12 is located at the inner stop point when the push rod 13 rotates, and the first hydraulic adjustment port 14*a* and the second hydraulic adjustment port 13*a* can be in communication with each other through the first flow guide groove 13*b*, thereby helping improve performance of the hydraulic adjustment apparatus.

In a possible implementation, a circular or semi-circular second flow guide groove 13*c* is provided along an inner circumference of the push rod support portion 14, and the second flow guide groove 13*c* is in communication with the first hydraulic adjustment port 14*a*.

In this embodiment of this application, the circular or semi-circular second flow guide groove 13*c* is provided on the inner circumference of the push rod support portion 14, the piston 12 is located at the inner stop point when the push rod 13 rotates, and the first hydraulic adjustment port 14*a* and the second hydraulic adjustment port 13*a* can be in communication with each other through the second flow guide groove 13*c*, thereby helping improve performance of the hydraulic adjustment apparatus.

In a possible implementation, the second hydraulic adjustment port 13*a* is disposed obliquely on the push rod 13 and runs through the push rod 13. A distance between a first end of the second hydraulic adjustment port 13*a* and the piston 12 is shorter than a distance between a second end of the second hydraulic adjustment port 13*a* and the piston 12. The first end is an end through which the second hydraulic adjustment port 13*a* is in communication with the first hydraulic adjustment port 14*a*. The second end is an end through which the second hydraulic adjustment port 13*a* is in communication with the first hydraulic chamber 16.

In this embodiment of this application, the distance between the first end of the second hydraulic adjustment port 13*a* and the piston 12 is set to be shorter than the distance between the second end of the second hydraulic adjustment port 13*a* and the piston 12, so that the second hydraulic adjustment port 13*a* and the first hydraulic adjustment port 14*a* that are in communication with each other can be in communication with the first hydraulic chamber 16.

In a possible implementation, when the piston 12 is located at the inner stop point, the push rod support portion 14 is spaced apart from the second hydraulic adjustment port 13*a*.

In this embodiment of this application, when the piston 12 is located at the inner stop point, the push rod support portion 14 is spaced apart from the second hydraulic adjustment port 13*a*, to prevent the push rod support portion 14 from blocking the second hydraulic adjustment port 13*a*, thereby helping the brake fluid flow into the second hydraulic adjustment port 13*a*, and improving depressurization efficiency of the hydraulic adjustment apparatus.

According to a second aspect, a brake system is provided, including a first group of brake wheel cylinders 28 and 29, a second group of brake wheel cylinders 26 and 27, and the hydraulic adjustment unit according to any possible implementation of the first aspect. The hydraulic adjustment unit provides a braking force for the first group of brake wheel cylinders 28 and 29 through the first brake pipe 110, and the hydraulic adjustment unit provides a braking force for the second group of brake wheel cylinders 26 and 27 through the second brake pipe 120.

In a possible implementation, the brake system further includes a driving apparatus 15. The driving apparatus 15 drives the piston 12 in the hydraulic adjustment apparatus 10 to move along an inner wall of the hydraulic cylinder 11 of the hydraulic adjustment unit. The piston 12 divides the hydraulic cylinder 11 into the first hydraulic chamber 16 and the second hydraulic chamber 17.

According to a third aspect, an automobile is provided, including the hydraulic adjustment unit according to the second aspect or the possible implementation of the second aspect. The hydraulic adjustment unit adjusts pressure of brake fluid in a brake pipe in the brake system to control magnitude of a braking force applied to a brake wheel cylinder in the brake system.

According to a fourth aspect, a method for controlling a brake system is provided. The brake system includes a hydraulic adjustment apparatus 10 with a bidirectional pressurization function. A hydraulic cylinder 11 of the hydraulic adjustment apparatus 10 is divided into a first hydraulic chamber 16 and a second hydraulic chamber 17 by a piston 12. The second hydraulic chamber 17 is connected to a first brake pipe 110 in the brake system and a second brake pipe 120 in the brake system. The first brake pipe 110 is configured to provide a braking force for a first group of brake wheel cylinders 28 and 29 in the brake system. The second brake pipe 120 is configured to provide a braking force for a second group of brake wheel cylinders 26 and 27 in the brake system. The first brake pipe 110 is provided with a first control valve 111. A closed-open status of the first control valve 111 controls a closed-open status of the first brake pipe 110. The second brake pipe 120 is provided with a second control valve 121. A closed-open status of the second control valve 121 controls a closed-open status of the second brake pipe 120. The first hydraulic chamber 16 is connected to the second brake pipe 120 through a third brake pipe 130 in the brake system. The first hydraulic chamber 16 provides a braking force for the second group of brake wheel cylinders 26 and 27 through the second brake pipe 120. When both the first control valve 111 and the second control valve 121 are in a closed state, the third brake pipe 130 is in communication with the first brake pipe 110 through the second brake pipe 120. The first hydraulic chamber 16 provides a braking force for the first group of brake wheel cylinders 28 and 29 through the first brake pipe 110. The method includes: A controller generates a control instruction. The control instruction is used to control a driving apparatus 15. The controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27.

In this embodiment of this application, the second hydraulic chamber 17 provides the braking force for the first group of brake wheel cylinders 28 and 29 through the first brake pipe 110 provided with the first control valve 111, and provides the braking force for the second group of brake wheel cylinders 26 and 27 through the second brake pipe 120 provided with the second control valve 121, thereby helping individually pressurize the first brake pipe 110 and the second brake pipe 120, and avoiding a prior-art case in which the closed-open status of the first brake pipe 110 and that of the second brake pipe 120 cannot be controlled when the braking forces are provided for the first group of brake wheel cylinders 28 and 29 and the second group of brake wheel cylinders 26 and 27 through the first brake pipe 110 and the second brake pipe 120 with one-way valves.

In addition, the second hydraulic chamber 17 may reuse the first brake pipe 110 provided with the first control valve 111 and the second brake pipe 120 provided with the second control valve 121 to determine whether to provide the braking force for the second group of brake wheel cylinders 26 and 27, thereby helping reduce a quantity of control valves in the brake system and reduce costs of the brake system.

In a possible implementation, the method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls both the first control valve 111 and the second control valve 121 to be in an open state.

In this embodiment of this application, after the braking circuit for providing the braking force for the first group of brake wheel cylinders 28 and 29 fails, the first control valve 111 and the second control valve 121 may be open, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls both the first control valve 111 and the second control valve 121 to be in an open state and the fourth control valve 142 to be in the open state.

In this embodiment of this application, after the braking circuit for providing the braking force for the first group of brake wheel cylinders 28 and 29 fails, the first control valve 111, the second control valve 121, and the fourth control valve 142 may be open, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls both the first control valve 111 and the second control valve 121 to be in an open state and the fifth control valve 131 to be in a closed state.

In this embodiment of this application, after the braking circuit for providing the braking force for the first group of brake wheel cylinders 28 and 29 fails, the first control valve 111 and the second control valve 121 may be open, the fifth control valve 131 is controlled to be closed, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the second group of brake wheel cylinders 26 and 27, the controller sends the control instruction to the driving apparatus 15, and controls the driving apparatus 15 to drive the piston 12 to compress a volume of the first hydraulic chamber 16, to press the brake fluid in the first hydraulic chamber 16 into the second group of brake wheel cylinders 26 and 27 through the second brake pipe 120, to increase the pressure of the brake fluid in the second group of brake wheel cylinders 26 and 27.

In this embodiment of this application, after the braking circuit for providing the braking force for the first group of brake wheel cylinders 28 and 29 fails, the controller controls the piston 12 to compress the volume of the first hydraulic chamber 16 to pressurize the second group of brake wheel cylinders 26 and 27 through the brake fluid in the first hydraulic chamber 16, that is, pressurization is performed on the second group of brake wheel cylinders 26 and 27 individually to improve safety of the brake system.

In a possible implementation, the method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls the first control valve 111 to be in an open state and controls the second control valve 121 to be in a closed state.

In this embodiment of this application, after the braking circuit for providing the braking force for the first group of brake wheel cylinders 28 and 29 fails, the first control valve 111 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls the first control valve 111 to be in an open state and controls the second control valve 121 and the fourth control valve 142 to be in a closed state.

In this embodiment of this application, after the braking circuit for providing the braking force for the first group of brake wheel cylinders 28 and 29 fails, the first control valve 111 may be open, the second control valve 121 and the fourth control valve 142 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls the second control valve 121 to be in an open state and controls the first control valve 111 and the fifth control valve 131 to be in the open state.

In this embodiment of this application, after the braking circuit for providing the braking force for the first group of brake wheel cylinders 28 and 29 fails, the first control valve 111 and the fifth control valve 131 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the second group of brake wheel cylinders 26 and 27, the controller sends the control instruction to the driving apparatus 15, and controls the driving apparatus 15 to drive the piston 12 to compress a volume of the second hydraulic chamber 17, to press the brake fluid in the second hydraulic chamber 17 into the second group of brake wheel cylinders 26 and 27 through the second brake pipe 120, to increase the pressure of the brake fluid in the second group of brake wheel cylinders 26 and 27.

In this embodiment of this application, after the braking circuit for providing the braking force for the first group of brake wheel cylinders 28 and 29 fails, the controller controls the piston 12 to compress the volume of the second hydraulic chamber 17 to pressurize the second group of brake wheel cylinders 26 and 27 through the brake fluid in the second hydraulic chamber 17, that is, pressurization is performed on the second group of brake wheel cylinders 26 and 27 individually to improve safely of the brake system.

In a possible implementation, the method further includes: When a braking circuit for providing the braking force for the second group of brake wheel cylinders 26 and 27 fails, and the second hydraulic chamber 17 is required to provide the braking force for the first group of brake wheel cylinders 28 and 29, the controller controls the first control valve 111 to be in an open state and controls the second control valve 121 to be in a closed state.

In this embodiment of this application, after the braking circuit for providing the braking force for the second group of brake wheel cylinders 26 and 27 fails, the first control valve 111 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing the braking force for the second group of brake wheel cylinders 26 and 27 fails, and the second hydraulic chamber 17 is required to provide the braking force for the first group of brake wheel cylinders 28 and 29, the controller controls the second control valve 121 to be in an open state and controls the first control valve 111 and the fourth control valve 142 to be in a closed state.

In this embodiment of this application, after the braking circuit for providing the braking force for the second group of brake wheel cylinders 26 and 27 fails, the second control valve 121 may be open, the first control valve 111 and the fourth control valve 142 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls both the first control valve 111 and the fifth control valve 131 to be in a closed state and the second control valve 121 to be in an open state.

In this embodiment of this application, after the braking circuit for providing braking force for the second group of brake wheel cylinders 26 and 27 fails, the second control valve 121 may be open, the first control valve 111 and the fifth control valve 131 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

In a possible implementation, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the first group of brake wheel cylinders 28 and 29, the controller sends the control instruction to the driving apparatus 15, and controls the driving apparatus 15 to drive the piston 12 to compress a volume of the second hydraulic chamber 17, to press the brake fluid in the second hydraulic chamber 17 into the first group of brake wheel cylinders 28 and 29 through the first brake pipe 110, to increase the pressure of the brake fluid in the first group of brake wheel cylinders 28 and 29.

In this embodiment of this application, after the braking circuit for providing the braking force for the second group of brake wheel cylinders 26 and 27 fails, the controller controls the piston 12 to compress the volume of the second hydraulic chamber 17 to pressurize the first group of brake wheel cylinders 28 and 29 through the brake fluid in the second hydraulic chamber 17, that is, pressurization is performed on the first group of brake wheel cylinders 28 and 29 individually to improve safety of the brake system.

According to a fifth aspect, a control apparatus is provided. The control apparatus includes a processing unit and a storage unit. The storage unit is configured to store instructions. The processing unit executes the instructions stored in the storage unit, so that the control apparatus performs any possible method in the third aspect.

Optionally, the control apparatus may be an independent controller in an automobile, or may be a chip with a control function in the automobile. The processing unit may be a processor. The storage unit may be a memory. The memory may be a storage unit (for example, a register or a cache) in a chip, or may be a storage unit (for example, a read-only memory or a random access memory), located outside the chip, in the automobile.

It should be noted that, in the foregoing controller, the memory is coupled to the processor. That the memory is coupled to the processor may be understood as that the memory is located inside the processor, or the memory is located outside the processor, to be independent of the processor.

According to a sixth aspect, a computer program product is provided. The computer program product includes computer program code. When the computer program code is run on a computer, the computer is enabled to perform the methods in the foregoing aspects.

It should be noted that all or some of the computer program code may be stored in a first storage medium. The first storage medium may be encapsulated together with the processor, or may be encapsulated separately with the processor. This is not specifically limited in this embodiment of this application.

According to a seventh aspect, a computer-readable medium is provided. The computer-readable medium stores computer program code. When the computer program code is run on a computer, the computer is enabled to perform the methods in the foregoing aspects.

BRIEF DESCRIPTION OF DRAWINGS

FIG. 1 is a schematic diagram of a hydraulic adjustment apparatus according to an embodiment of this application;

FIG. 2(*a*) and FIG. 2(*b*) are a schematic structural diagram of a first flow guide groove according to an embodiment of this application;

FIG. 12 is a flowchart of a control method according to an embodiment of this application;

DESCRIPTION OF EMBODIMENTS

Figure 3:
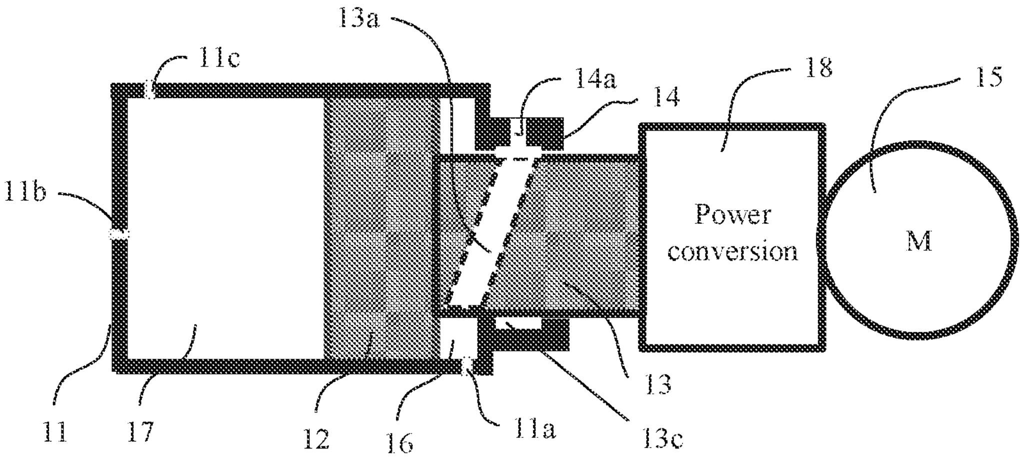
FIG. 3 is a schematic structural diagram of a second flow guide groove according to an embodiment of this application.

The following describes technical solutions of this application with reference t accompanying drawings.

It should be noted that, an "outlet pipe" and an "inlet pipe" mentioned in the following may correspond to different brake pipes, or may correspond to a same brake pipe. The "outlet pipe" and the "inlet pipe" are distinguished only based on functions of the brake pipes in a brake system. For example, when the "outlet pipe" and the "inlet pipe" correspond to a same first brake pipe, it may be understood that the first brake pipe in the brake system is used to deliver brake fluid in a brake wheel cylinder to a fluid storage apparatus in a process of depressurizing wheels of an automobile. The first brake pipe may be referred to as an "outlet pipe". In a process of pressurizing the wheels of the automobile, the first brake pipe is used to provide brake fluid for the wheels of the automobile, and provide a braking force for the wheels of the automobile. In this case, the first brake pipe may be referred to as an "inlet pipe".

In addition, an "inlet valve", an "outlet valve", and a "pressure equalizing valve" used in the following are distinguished only based on functions of the control valves in the brake system. A control valve used to control opening or closing of the inlet pipe may be referred to as an "inlet valve" or a "booster valve". A control valve configured to control opening or closing of a fluid return pipe may be referred to as an "outlet valve" or a "pressure reducing valve". A control valve used to isolate a two-stage braking subsystem may be referred to as an "isolation valve". The control valve may be a valve commonly used in an existing brake system, for example, a solenoid valve. This is not specifically limited in the embodiments of this application.

In addition, after the control valve is connected to the brake pipe, a connection port between the control valve and the brake pipe may be indicated by a first end and a second end, and a flow direction of the brake fluid between the first end and the second end is not limited in this application. For example, the brake fluid may flow from the first end of the control valve to the second end of the control valve when the control valve is in a closed state, or the brake fluid may flow from the second end of the control valve to the first end of the control valve when the control valve is in an open state.

In addition, a "first brake pipe 110", a "second brake pipe 120", a "third brake pipe 130" a "fourth brake pipe 140", and other brake pipes used in the following may be construed as one or more sections of brake pipes that implement a particular function. For example, the third brake pipe 130 is a multi-section brake pipe used to connect a brake master cylinder and a brake wheel cylinder of a first group of wheels.

In addition, when the following describes an architecture such as a brake system and an automobile with reference to the accompanying drawings, the accompanying drawings schematically show two operating states (open or closed) that each control valve can achieve, and do not limit a current operating state of the control valve to that shown in the drawings.

In addition, when the following describes an architecture such as a hydraulic adjustment unit, a brake system, and an automobile with reference to the accompanying drawings, components having a same function in the accompanying drawings corresponding to the embodiments use the same number. For brevity, functions of the components are not described in each embodiment, and reference may be made to the description of the functions of the components in the entire text.

For ease of understanding of this application, the following first describes, with reference to FIG. 1 to FIG. 3, a hydraulic adjustment apparatus applicable to the embodiments of this application. It should be understood that the solutions in the embodiments of this application are further applicable to another hydraulic adjustment apparatus that has a bidirectional pressurization/depressurization function. This is not limited in the embodiments of this application.

FIG. 1 is a schematic diagram of a hydraulic adjustment apparatus according to an embodiment of this application. The hydraulic adjustment apparatus 10 shown in FIG. 1 includes a hydraulic cylinder 11, a piston 12, a push rod 13, and a push rod support portion 14.

The piston 12 moves along an inner wall of the hydraulic cylinder 11. The piston 12 divides the hydraulic cylinder 11 into a first hydraulic chamber 16 and a second hydraulic chamber 17. An end portion of the first hydraulic chamber 16 is provided with the push rod support portion 14. The push rod support portion 14 supports the push rod 13, and the push rod support portion 14 is provided with a first hydraulic adjustment port 14*a*. The push rod 13 is provided with a second hydraulic adjustment port 13*a*. A first end of the second hydraulic adjustment port 13*a* is in communication with the first hydraulic chamber 16. When the piston 12 is located at an inner stop point of a piston stroke, the first hydraulic adjustment port 14*a* is in communication with a second end of the second hydraulic adjustment port 13*a*. When the piston 12 is located at a position in the piston stroke other than the inner stop point, the first hydraulic adjustment port 14*a* is not in communication with the second end of the second hydraulic adjustment port 13*a*.

As shown in FIG. 1, the driving apparatus 15 pushes, through the push rod 13, the piston 12 to move along the inner wall of the hydraulic cylinder 11 and form the piston stroke, the hydraulic cylinder 11 is divided by the piston 12 into two hydraulic chambers: the first hydraulic chamber 16 and the second hydraulic chamber 17. A first flow channel connected to the first hydraulic chamber 16 includes a port 11*a* and a port 11*d*. A second flow channel connected to the second hydraulic chamber 17 includes a port 11*c* and a port 11*b*.

The piston 12 is movably disposed in the hydraulic cylinder 11, one end of the push rod 13 extends into the hydraulic cylinder 11 and is connected to the piston 12, and the other end of the push rod 13 penetrates the hydraulic cylinder 11 and is in transmission connection with the driving apparatus 15. Driven by the driving apparatus 15, the piston 12 is capable of reciprocating movement within the hydraulic cylinder 11 to implement a pressurization or depressurization (depressurization) operation on the brake system.

It should be noted that the piston 12 may be driven by the driving apparatus 15, and the driving apparatus 15 may be another apparatus having a driving capability, for example, a motor. It should be understood that, when the driving apparatus 15 is a motor, a part of the motor outputs torque. Therefore, in order to convert the torque output by the motor into a linear motion for driving the push rod 13, the driving apparatus 15 and the push rod 13 may be further connected by using a deceleration mechanism or another power conversion mechanism 18. The power conversion mechanism may include, for example, a turbine worm assembly or a ball screw nut assembly.

During the movement of the piston 12 along the inner wall of the hydraulic cylinder 11, a position at which the piston 12 is farthest away from a drive shaft (for example, a crankshaft center) of the driving apparatus 15 is referred to as an "outer stop center". Correspondingly, a position at which the piston 12 is closest to the drive shaft (for example, the crankshaft center) of the driving apparatus 15 is referred to as an "inner stop point". A distance between the "outer stop point" and the "inner stop point" is referred to as the piston stroke.

The first hydraulic chamber 16 and the second hydraulic chamber 17 are separated by the piston 12 and are configured so that volumes of the first hydraulic chamber 16 and the second hydraulic chamber 17 change with movement of the piston 12. Specifically, when the piston 12 moves forward (leftward in FIG. 1), the volume of the first hydraulic chamber 16 is increased and the volume of the second hydraulic chamber 17 is reduced. When the piston 12 moves backward (rightward in FIG. 1), the volume of the first hydraulic chamber 16 is reduced and the volume of the second hydraulic chamber 17 is increased.

Usually, the forward movement of the piston 12 may be referred to as "forward movement" and the backward movement of the piston 12 may be referred to as "reverse movement". When the hydraulic adjustment apparatus 10 performs a pressurization operation on the brake system, pressurization of the forward movement may be referred to as forward pressurization and pressurization of the reverse movement may be referred to as reverse pressurization. The forward pressurization and the reverse pressurization are to be further described below when the hydraulic adjustment unit or the brake system including the hydraulic adjustment apparatus 10 is described.

The end portion of the first hydraulic chamber 16 is provided with the push rod support portion 14. The push rod support portion 14 supports the push rod 13, and the push rod support portion 14 is provided with the first hydraulic adjustment port 14*a*.

It should be noted that, the push rod support portion 14 and the hydraulic cylinder 11 may be integrally formed, or the push rod support portion 14 and the hydraulic cylinder 11 may be assembled at a later stage. This is not limited in this embodiment of this application.

Optionally, the push rod support portion 14 is further provided with a sealing member (not shown), to prevent the brake fluid from flowing out of the first hydraulic chamber 16 through a gap between the push rod 13 and the push rod support portion 14.

The push rod 13 is provided with the second hydraulic adjustment port 13*a*. The first hydraulic chamber 16 is in communication with the second hydraulic adjustment port 14*a* through the first hydraulic adjustment port 14*a* when the piston 12 is located at the inner stop point of the piston stroke. Conversely, when the piston 12 is located at a position in the piston stroke other than the inner stop point, the first hydraulic adjustment port 14*a* is not in communication with the second hydraulic adjustment port 13*a*.

That the first hydraulic chamber 16 is in communication with the second hydraulic adjustment port 14*a* through the first hydraulic adjustment port 14*a* may be understood as follows: The brake fluid in the first hydraulic chamber 16 can be discharged from the first hydraulic chamber 16 through the first hydraulic adjustment port 14*a* and the second hydraulic adjustment port 13*a* that are in communication with each other. Alternatively, the brake fluid can enter the first hydraulic chamber 16 through the first hydraulic adjustment port 14*a* and the second hydraulic adjustment port 13*a* that are in communication with each other.

The first hydraulic adjustment port 14*a* and the second hydraulic adjustment port 13*a* may be considered as the ports of the foregoing first flow channel in communication with the first hydraulic chamber 16.

Optionally, the brake fluid in the first hydraulic chamber 16 may flow into the first hydraulic chamber through the third hydraulic adjustment port 11*a* provided in the first hydraulic chamber. The third hydraulic adjustment port 11*a* is in communication with the first hydraulic chamber 16 and a brake pipe of the brake system. The brake pipe may be in communication with a brake wheel cylinder of the automobile wheel, and a controller of the brake system can adjust a braking force applied to the wheel by adjusting hydraulic pressure in the brake pipe.

In other words, in a pressurization process, the first hydraulic chamber 16 can pump the brake fluid into the brake pipe through the third hydraulic adjustment port 11*a*, thereby increasing the braking force applied to the wheel. In a depressurization process, based on a pressure difference in the brake system, the brake fluid in the brake pipe may flow into the first hydraulic chamber 16 through the third hydraulic adjustment port 11*a*, thereby reducing or canceling the braking force applied to the wheel.

Optionally, the hydraulic cylinder 11 may be further provided with a fourth hydraulic adjustment port 11*b*, and the fourth hydraulic adjustment port 11*b* is configured to communicate the second hydraulic chamber 17 with the brake pipe of the brake system through a pipe.

Similarly, the second hydraulic chamber 17 can discharge the brake fluid into the brake pipe through the fourth hydraulic adjustment port 11*b*, and perform a pressurization operation on the brake pipe, thereby increasing the braking force applied to the wheel. The brake fluid in the brake pipe can also be discharged into the second hydraulic chamber 17 through the fourth hydraulic adjustment port 11*b* to perform a depressurization operation on the brake pipe, thereby reducing or canceling the braking force applied to the wheel.

The fourth hydraulic adjustment port 11*b* may also communicate with the second hydraulic chamber 17 and the first hydraulic chamber 16 through the brake pipe. With the above arrangement, when the hydraulic adjustment apparatus 10 performs forward pressurization, a part of the brake fluid in the second hydraulic chamber 17 can be discharged into the brake pipe to brake the wheel, and the remaining part of the brake fluid can be discharged into the first hydraulic chamber 16. In this way, a pressure difference between the second hydraulic chamber 17 and the first hydraulic chamber 16 can be reduced, working load of the driving apparatus 15 can be reduced, and a service life of the driving apparatus 15 can be increased.

The hydraulic cylinder 11 may be further provided with a fifth hydraulic adjustment port 11*c*, and the fifth hydraulic adjustment port 11*c* is configured to discharge the brake fluid supplemented by the fluid storage apparatus 30.

Specifically, the fifth hydraulic adjustment port 11*c* is in communication with the fluid storage apparatus 30 through a pipe. During reverse pressurization, in order to reduce the pressure difference between the second hydraulic chamber 17 and the first hydraulic chamber 16, in a process of rightward movement of the piston 12, the brake fluid in the fluid storage apparatus 30 can be replenished into the second hydraulic chamber 17 in time through the fifth hydraulic adjustment port 11*c*.

Therefore, the hydraulic adjustment apparatus 10 provided in this embodiment of this application can implement bidirectional pressurization through forward movement or backward movement, thereby ensuring continuity of the pressurization process, and improving comfort during braking. On the other hand, the hydraulic adjustment apparatus 10 in this embodiment of this application can rapidly generate pressure, to rapidly pressurize the brake system, thereby reducing a control response time of the system, and meeting a control and safety requirement of a vehicle.

Optionally, in order to facilitate communication between the first hydraulic chamber 16 and the first hydraulic adjustment port 14*a*, the second hydraulic adjustment port 13*a* may be obliquely provided on the push rod 13 and run through the push rod 13. A distance between a fluid inlet of the second hydraulic adjustment port 13*a* and the piston 12 is shorter than a distance between a fluid outlet of the second hydraulic adjustment port 13*a* and the piston 12.

That the distance between the fluid inlet (also referred to as the first end) of the second hydraulic adjustment port 13*a* and the piston 12 is shorter than the distance between the fluid outlet (also referred to as the second end) of the second hydraulic adjustment port 13*a* and the piston 12 may be understood as follows: A side of the second hydraulic adjustment port 13*a* in communication with the first hydraulic adjustment port 14*a* is closer to the piston 12 than a side of the second hydraulic adjustment port 13*a* in communication with the first hydraulic chamber 16. Certainly, the second hydraulic adjustment port 13*a* may alternatively be a U-shaped hole or the like. This is not limited in this application.

Usually, in order to prevent the push rod support portion 14 from blocking the second hydraulic adjustment port 13*a* when the piston 12 is located at the inner stop point or the outer stop point, the push rod support portion 14 may be spaced apart from the second hydraulic adjustment port 13*a*, or when the piston 12 is located at the inner stop point or the outer stop point, there may be a particular spacing between the push rod support portion 14 and the second hydraulic adjustment port 13*a* so that the brake fluid in the first hydraulic chamber 16 can enter or exit the second hydraulic adjustment port 13*a* without being blocked. Certainly, the push rod support portion 14 may alternatively block a part of the second hydraulic adjustment port 13*a*. This is not limited in this embodiment of this application.

Usually, the push rod 13 may rotate after a long time of operation, and correspondingly, the second hydraulic adjustment port 13*a* provided on the push rod 13 may also rotate. In this case, even if the piston 12 is at the inner stop point, the second hydraulic adjustment port 13*a* after rotation cannot be in communication with the first hydraulic adjustment port 14*a*. For example, the outlet of the second hydraulic adjustment port 13*a* after rotation may be blocked by an inner wall of the push rod support portion 14, and correspondingly, the first hydraulic adjustment port 14*a* may be blocked by an outer wall of the push rod 13.

To avoid the foregoing problem, a first flow guide groove 13*b* may be disposed along an outer circumference of the push rod 13, and the first flow guide groove 13*b* is in communication with the second hydraulic adjustment port 13*a*. After the push rod 13 rotates, the first flow guide groove 13*b* can ensure that the second hydraulic adjustment port 13*a* and the first hydraulic adjustment port 14*a* remain in communication with each other.

Optionally, the first flow guide groove 13*b* may be in a circular shape or a semi-circular shape along the outer circumference of the push rod 13. Certainly, it is beneficial to reduce impact of the first flow guide groove 13*b* on mechanical strength of the push rod 13 when the first flow guide groove 13*b* is a semi-circular groove provided along the outer circumference of the push rod 13. It should be understood that an arc length of the semi-circular ring may be determined based on a maximum amount of rotation of the push rod 13.

The following uses a first flow guide groove shown in FIG. 2(*a*) and FIG. 2(*b*) as an example for description. FIG. 2(*a*) and FIG. 2(*b*) are a schematic structural diagram of the first flow guide groove according to this embodiment of this application. FIG. 2(*b*) is a main view of the push rod 13, and FIG. 2(*a*) is a cross-sectional view from a perspective along A-A in FIG. 2(*b*).

The first flow guide groove 13*b* may be provided along the outer circumference of the push rod 13. The first flow guide groove 13*b* is arranged along the circumference of the push rod 13, and the second hydraulic adjustment port 13*a* is in communication with the first flow guide groove 13*b*. In this way, when the piston 12 is moved to the inner stop point, the second hydraulic adjustment port 13*a* is in communication with the first hydraulic adjustment port 14*a* through the first flow guide groove 13*b*, so that press can be reduced rapidly.

The first flow guide groove 13*b* is provided along the outer circumference of the push rod 13 and has a particular length, so that when the push rod 13 rotates, the first flow guide groove 13*b* is always in communication with the first hydraulic adjustment port 14*a*, and the second hydraulic adjustment port 13*a* is also in communication with the first flow guide groove 13*b*, that is, in this case, it can still be ensured that the second hydraulic adjustment port 13*a* and the first hydraulic adjustment port 14*a* are in communication with each other.

As shown in FIG. 2(*a*), the first flow guide groove 13*b* is an annular end-to-end groove. This ensures that the first flow guide groove 13*b* and the first hydraulic adjustment port 14*a* always remain in communication with each other, and that the first flow guide groove 13*b* and the second hydraulic adjustment port 13*a* also always remain in communication with each other, regardless of an angle of rotation by the push rod 13. In this way, the second hydraulic adjustment port 13*a* and the first hydraulic adjustment port 14*a* always remain in communication with each other.

Optionally, a circular or semi-circular second flow guide groove 13*c* is provided along an inner circumference of the push rod support portion 14, and the second flow guide groove 13*c* is in communication with the first hydraulic adjustment port 14*a*. The following describes a structure of the second flow guide groove 13*c* in this embodiment of this application with reference to FIG. 3.

FIG. 3 is a schematic structural diagram of the second flow guide groove according to this embodiment of this application. As shown in FIG. 3, the second flow guide groove 13*c* may be provided on the inner wall of the push rod support portion 14, and the second flow guide groove 13*h* is in communication with the first hydraulic adjustment port 14*a*.

The second flow guide groove 13*c* may be provided along the inner circumference of the push rod support portion 14. Because the inner circumference of the push rod support portion 14 always covers the outer circumference of the push rod 13, even if the push rod 13 rotates, the second flow guide groove 13*c* located on the inner circumference of the push rod support portion 14 can also be in communication with the second hydraulic adjustment port 13*a*, that is, the second hydraulic adjustment port 13*a* is in communication with the first hydraulic adjustment port 14*a*.

In this embodiment of this application, the second flow guide groove 13*c* is provided on the push rod support portion 14, thereby helping reduce impact on mechanical strength of the push rod 13, and preventing the push rod 13 from breaking after a long time of working.

In a dual circuit electro-hydraulic brake (Electro-Hydraulic Brake, EHB) system of a conventional hydraulic adjustment apparatus based on bidirectional pressurization/pressurization, a first hydraulic chamber in the hydraulic adjustment apparatus provides a braking force for a first group of wheels through a first oil inlet pipe and provides a braking force for a second group of wheels through a second oil inlet pipe. Correspondingly, a second hydraulic chamber in the hydraulic adjustment apparatus also provides a braking force for the first group of wheels and the second group of wheels through the first oil inlet pipe and the second oil inlet pipe, respectively. However, the first oil inlet pipe and the second oil inlet pipe are inlet pipes with one-way valves, and such inlet pipes can control only a flow direction of brake fluid, but cannot control a closed-open status of the inlet pipes. When fluid leakage occurs in either of the first oil inlet pipe and the second oil inlet pipe, because the oil inlet pipe that leaks fluid cannot be closed, pressurization cannot be performed on the other oil inlet pipe that operates normally. As a result, neither of the two oil inlet pipes can provide any braking force for the wheels, reducing driving safety.

To avoid the foregoing problem, the embodiments of this application provide a new hydraulic adjustment unit that provides a braking force for a first group of brake wheel cylinders 28 and 29 and a second group of brake wheel cylinders 26 and 27 through oil inlet pipes with control valves, respectively. The following describes the hydraulic adjustment unit in the embodiments of this application with reference to FIG. 1 by using a hydraulic adjustment apparatus 10 as an example.

Figure 4:
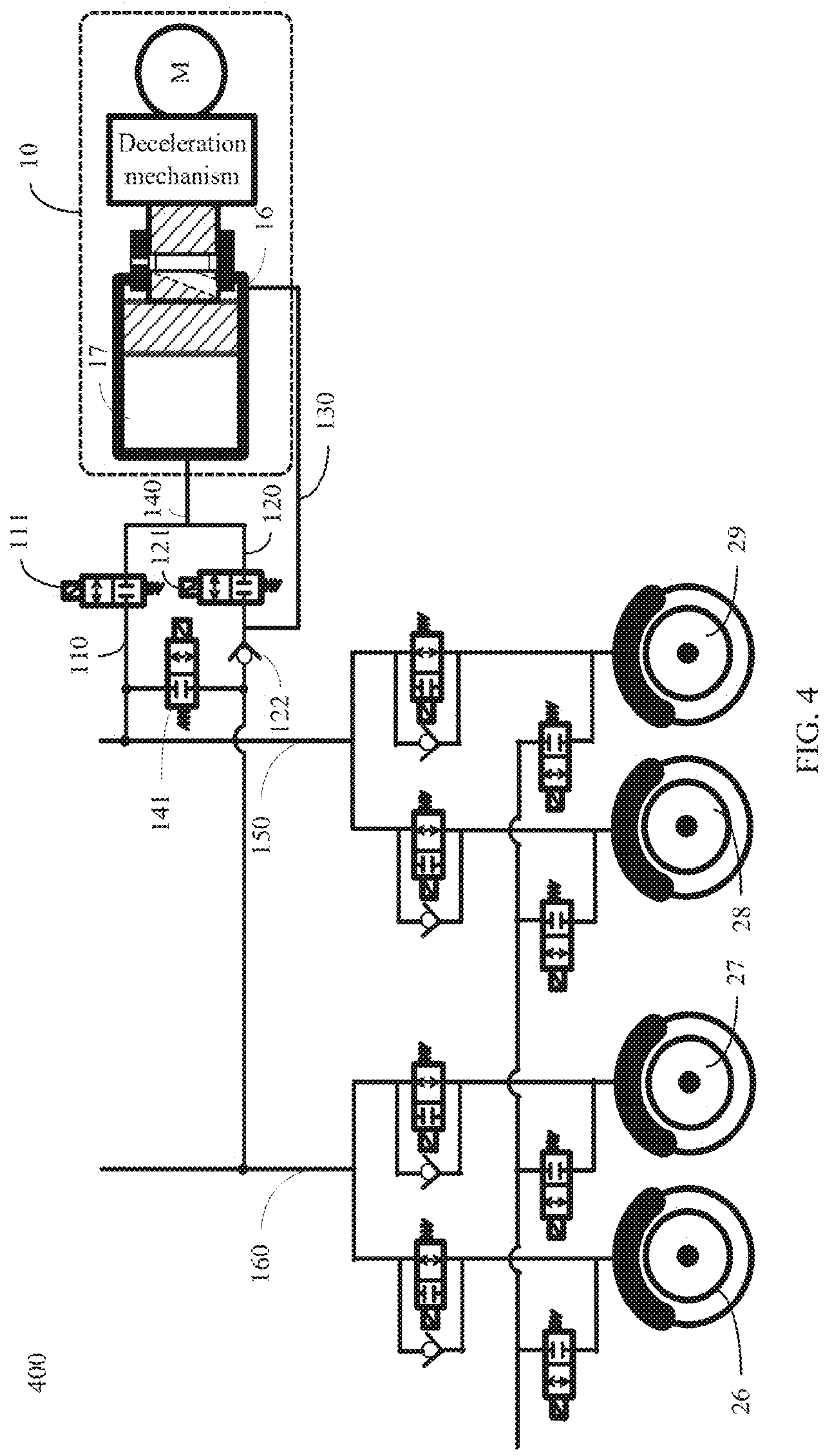
FIG. 4 is a schematic diagram of a hydraulic adjustment unit according to an embodiment of this application.

FIG. 4 is a schematic diagram of a hydraulic adjustment unit according to an embodiment of the application. The hydraulic adjustment unit 400 shown in FIG. 4 includes a hydraulic adjustment apparatus 10, a first hydraulic chamber 16, a second hydraulic chamber 17, a first brake pipe 110, a second brake pipe 120, a third brake pipe 130, a first control valve 111, and a second control valve 121.

The hydraulic adjustment apparatus 10 has bidirectional pressurization/depressurization function, and the hydraulic adjustment apparatus 10 includes the first hydraulic chamber 16 and the second hydraulic chamber 17.

The second hydraulic chamber 17 is connected to the first brake pipe 110 and the second brake pipe 120. The first brake pipe 110 is used to provide a braking force for a first group of brake wheel cylinders 28 and 29 in a brake system. The second brake pipe 120 is used to provide a braking force for a second group of brake wheel cylinders 26 and 27 in the brake system. The first brake pipe 110 is provided with a first control valve 111. A closed-open status of the first control valve 111 controls a closed-open status of the first brake pipe 110. The second brake pipe 120 is provided with a second control valve 121. A closed-open status of the second control valve 121 controls a closed-open status of the second brake pipe 120.

That the closed-open status of the first control valve 111 controls the closed-open status of the first brake pipe 110 may be understood as follows: When the first control valve 111 is in an open state, the first brake pipe 110 is open, and the brake fluid cannot flow to the first group of brake wheel cylinders 28 and 29 through the first brake pipe 110.

That the closed-open status of the second control valve 121 controls the closed-open status of the second brake pipe 120 may be understood as follows: When the second control valve 121 is in the open state, the second brake pipe 120 is open, and the brake fluid cannot flow to the second group of brake wheel cylinders 26 and 27 through the second brake pipe 120.

Optionally, the first group of brake wheel cylinders 28 and 29 may include a brake wheel cylinder of a right front wheel and a brake wheel cylinder of a left front wheel of the automobile. In this case, the second group of brake wheel cylinders 26 and 27 may include a brake wheel cylinder of a right rear wheel and a brake wheel cylinder of a left rear wheel of the automobile. In this case, the hydraulic brake units may be understood as being arranged in an H-shaped in the automobile. Alternatively, the first group of brake wheel cylinders 28 and 29 may include a brake wheel cylinder of a right front wheel and a brake wheel cylinder of a left rear wheel of the automobile. In this case, the second group of brake wheel cylinders 26 and 27 may include a brake wheel cylinder of a right rear wheel and a brake wheel cylinder of a left front wheel of the automobile. In this case, the hydraulic brake units may be understood as being arranged in an X-shaped in the automobile.

That the second hydraulic chamber 17 is connected to the first brake pipe 110 and the second brake pipe 120 may be understood as follows: The second hydraulic chamber 17 is directly connected to the first brake pipe 110 and the second brake pipe 120. That is, the fourth hydraulic adjustment port 11*b* of the second hydraulic chamber 17 is a pressure inlet port of the first brake pipe 110, and the fourth hydraulic adjustment port lib of the second hydraulic chamber 17 is a pressure inlet port of the second brake pipe 120. In other words, the first brake pipe 110 is in communication with the second brake pipe 120.

That the second hydraulic chamber 17 is connected to the first brake pipe 110 and the second brake pipe 120 may alternatively be understood as follows: The second hydraulic chamber 17 is connected to the first brake pipe 110 and the second brake pipe 120 through a section of pipe. That is, the second hydraulic chamber 17 is connected to the first brake pipe 110 and the second brake pipe 120 through a fourth brake pipe 140. As shown in FIG. 1, the second hydraulic chamber 17 is connected to a first end of the fourth brake pipe 140, a second end of the fourth brake pipe 140 is connected to a first end of the first control valve 111 in the first brake pipe 110, and the second end of the fourth brake pipe 140 is connected to a first end of the second control valve 121 in the second brake pipe 120. In other words, the first brake pipe 110 is in communication with the second brake pipe 120.

The first hydraulic chamber 16 is connected to the second brake pipe 120 through the third brake pipe 130 in the brake system. The first hydraulic chamber 16 provides a braking force for the second group of brake wheel cylinders 26 and 27 through the second brake pipe 120. When both the first control valve 111 and the second control valve 121 are in a closed state, the third brake pipe 130 is in communication with the first brake pipe 110 through the second brake pipe 120. The first hydraulic chamber 16 provides a braking force for the first group of brake wheel cylinders 28 and 29 through the first brake pipe 110.

The first end of the second control valve 121 is a port connected to the fourth brake pipe 140. In this case, the first end of the second control valve 121 is an end other than the first end of the two ends of the second control valve 121 connected to the second brake pipe 120.

As shown in FIG. 1, an interface between the third brake pipe 130 and the second brake pipe 120 is connected to a second end of the second control valve 121. In this case, the second brake pipe 120 is in communication with the third brake pipe 130, and the closed-open status of the first control valve 111 and that of the second control valve 121 have no impact on a connection or disconnection state between the second brake pipe 120 and the third brake pipe 130. However, when the first control valve 111 and the second control valve 121 are simultaneously in the closed state, the second brake pipe 120 is in communication with the first brake pipe 110, that is, the third brake pipe 130 may be in communication with the first brake pipe 110 through the second brake pipe 120. In this case, the first hydraulic chamber 16 can provide the braking force for the first group of brake wheel cylinders 28 and 29 through the third brake pipe 130, the second brake pipe 120, and the first brake pipe 110.

Correspondingly, when the first control valve 111 and the second control valve 121 are simultaneously in the open state, the second brake pipe 120 is disconnected from the first brake pipe 110, in other words, the third brake pipe 130 cannot be in communication with the first brake pipe 110 through the second brake pipe 120. In this case, the first hydraulic chamber 16 can provide the braking force for the second group of brake wheel cylinders 26 and 27 only through the third brake pipe 130 and the second brake pipe 120.

In this embodiment of this application, the second hydraulic chamber 17 provides the braking force for the first group of brake wheel cylinders 28 and 29 through the first brake pipe 110 provided with the first control valve 111, and provides the braking force for the second group of brake wheel cylinders 26 and 27 through the second brake pipe 120 provided with the second control valve 121, thereby helping individually pressurize the first brake pipe 110 and the second brake pipe 120, and avoiding a prior-art case in which the closed-open status of the first brake pipe 110 and that of the second brake pipe 120 cannot be controlled when the braking forces are provided for the first group of brake wheel cylinders 28 and 29 and the second group of brake wheel cylinders 26 and 27 through the first brake pipe 110 and the second brake pipe 120 with one-way valves.

In addition, the second hydraulic chamber 17 may reuse the first brake pipe 110 provided with the first control valve 111 and the second brake pipe 120 provided with the second control valve 121 to determine whether to provide the braking force for the second group of brake wheel cylinders 26 and 27, thereby helping reduce a quantity of control valves in the brake system and reduce costs of the brake system.

When the braking forces are provided for the first group of brake wheel cylinders 28 and 29 and the second group of brake wheel cylinders 26 and 27 through the first brake pipe 110 and the second brake pipe 120 respectively, in order to equalize pressure of brake fluids in the two brake pipes, a third control valve 141 may be disposed between a second end of the first control valve 111 and the second end of the second control valve 121, and the third control valve 141 controls connection or disconnection between the second end of the second control valve 121 and the second end of the first control valve 111. In this way, when the third control valve 141 is in the closed state, the second end of the first control valve 111 is electrically connected to the second end of the second control valve 121, and the pressure between the two brake pipes is equalized. Certainly, if pressure balance between the two brake pipes is not considered, the third control valve 141 may alternatively not be disposed. This is not limited in this embodiment of this application.

It should be noted that, because the third control valve 141 is configured to balance the pressure of the brake fluids in the first brake pipe 110 and the second brake pipe 120, the third control valve 141 may also be referred to as a "pressure equalizing valve 141".

After the third control valve 141 is in a closed state, a part of the brake fluid in the first brake pipe 110 flows to the second brake pipe 120 through the third control valve 141 and flows to the second hydraulic chamber 17 through the second control valve 121. Consequently, this part of the brake fluid cannot reach the brake wheel cylinder, reducing braking efficiency. To avoid this problem, as shown in FIG. 1, a first one-way valve 122 may be disposed between a first interface and a second interface. The first interface is an interface between the third brake pipe 130 and the second brake pipe 120. The second interface is an interface between the third control valve 141 and the second brake pipe 120. The first one-way valve 122 allows the brake fluid to flow from the first interface to the second interface, and the first one-way valve 122 prevents the brake fluid from flowing from the second interface to the first interface. Certainly, if a braking efficiency problem is not considered, the first one-way valve 122 may alternatively not be disposed. This is not limited in this embodiment of this application.

When the first control valve 111 and the second control valve 121 are in the closed state, the first hydraulic chamber 16 may provide the braking force for the first group of brake wheel cylinders 27 and 28 through the second brake pipe 120 and the first brake pipe 110. However, when the brake fluid flows from the second brake pipe 120 to the first control valve 111 through the second control valve 121, a part of the brake fluid may flow through the fourth brake pipe 140 into the second hydraulic chamber 17. This reduces to some extent efficiency of the first hydraulic chamber 16 in providing the braking force for the first group of brake wheel cylinders 27 and 28.

Figure 5:
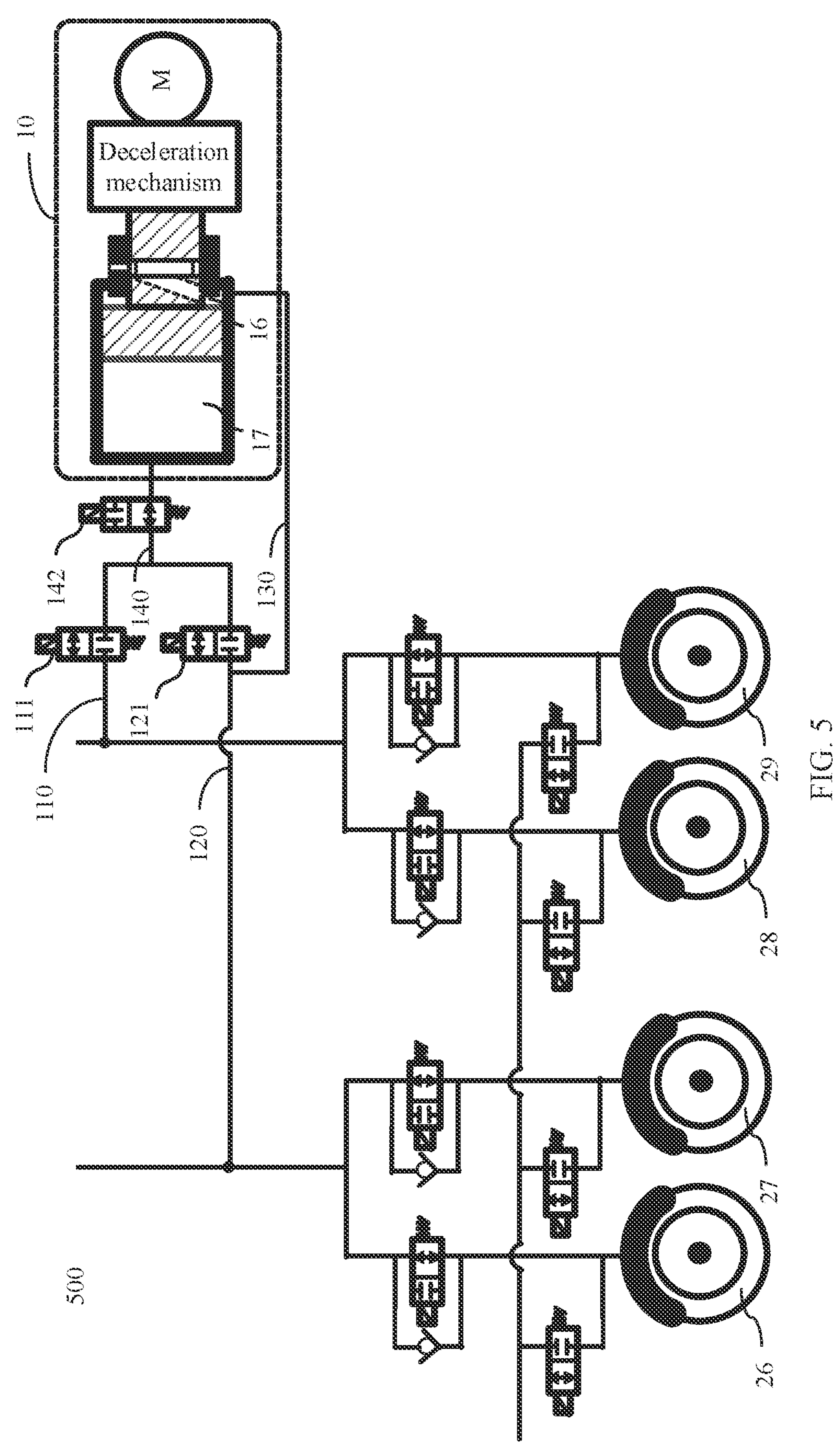
FIG. 5 is a schematic diagram of a hydraulic adjustment unit according to another embodiment of this application.

To avoid the foregoing problem, the fourth brake pipe 140 may be provided with a fourth control valve 142, to control closing or opening of the fourth brake pipe 140 through closing or opening of the fourth control valve 142. In this way, when the first control valve 111 and the second control valve 121 are in the closed state, the fourth control valve 142 is in the open state. In this case, when the brake fluid flows from the second brake pipe 120 to the first control valve 111 through the second control valve 121, the brake fluid entering the fourth brake pipe 140 is blocked by the fourth control valve 142 and cannot flow into the second hydraulic chamber 17. For arrangement of the control valves in the foregoing brake pipes, refer to FIG. 5.

As described above, the closing or opening of the first control valve 111 and the second control valve 121 can control only whether the first hydraulic chamber 16 provides the braking force for the first group of brake wheel cylinders 28 and 29, but cannot control whether the first hydraulic chamber 16 provides the braking force for the second group of brake wheel cylinders 26 and 27. Therefore, the third brake pipe 130 may be further provided with a fifth control valve 131, and closing or opening of the third brake pipe 130 is controlled by a closed-open status of the fifth control valve 131.

Figure 6:
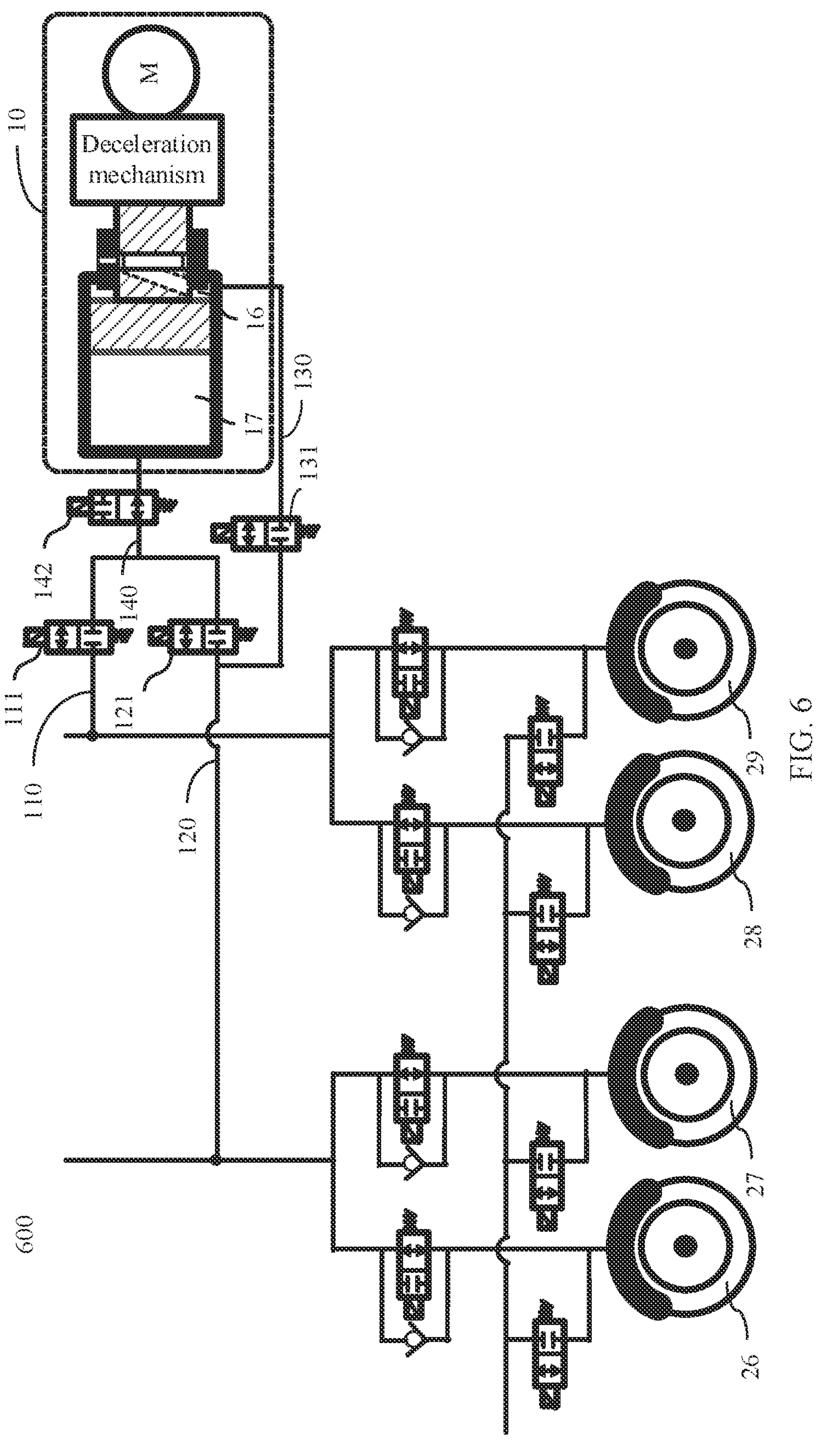
FIG. 6 is a schematic diagram of a hydraulic adjustment unit according to another embodiment of this application.

As shown in FIG. 6, when the fifth control valve 131 is in the closed state, the third brake pipe 130 is open, and the first hydraulic chamber 16 may provide the braking force for the second group of brake wheel cylinders 26 and 27 through the third brake pipe 130 and the second brake pipe 120. When the fifth control valve 131 is in the open state, the third brake pipe 130 is closed, and the first hydraulic chamber 16 cannot provide the braking force for the second group of brake Wheel cylinders 26 and 27 through the third brake pipe 130 or the second brake pipe 120.

A connection manner between the hydraulic adjustment apparatus and the dual circuit brake system in the embodiments of this application is described above with reference to FIG. 4 to FIG. 6. A connection manner between the hydraulic adjustment apparatus and the fluid storage apparatus 30 is described below with reference to FIG. 7 and FIG. 8. It should be understood that, for ease of understanding, the following describes a connection manner between the hydraulic adjustment apparatus 10 and the fluid storage apparatus 30 by using the hydraulic adjustment apparatus 10 as an example.

Connection manner 1: The second hydraulic chamber 17 is provided with a first inlet pipe 170 connected to the fluid storage apparatus 30, and the first hydraulic chamber 16 is provided with no inlet pipe connected to the fluid storage apparatus 30.

Figure 7:
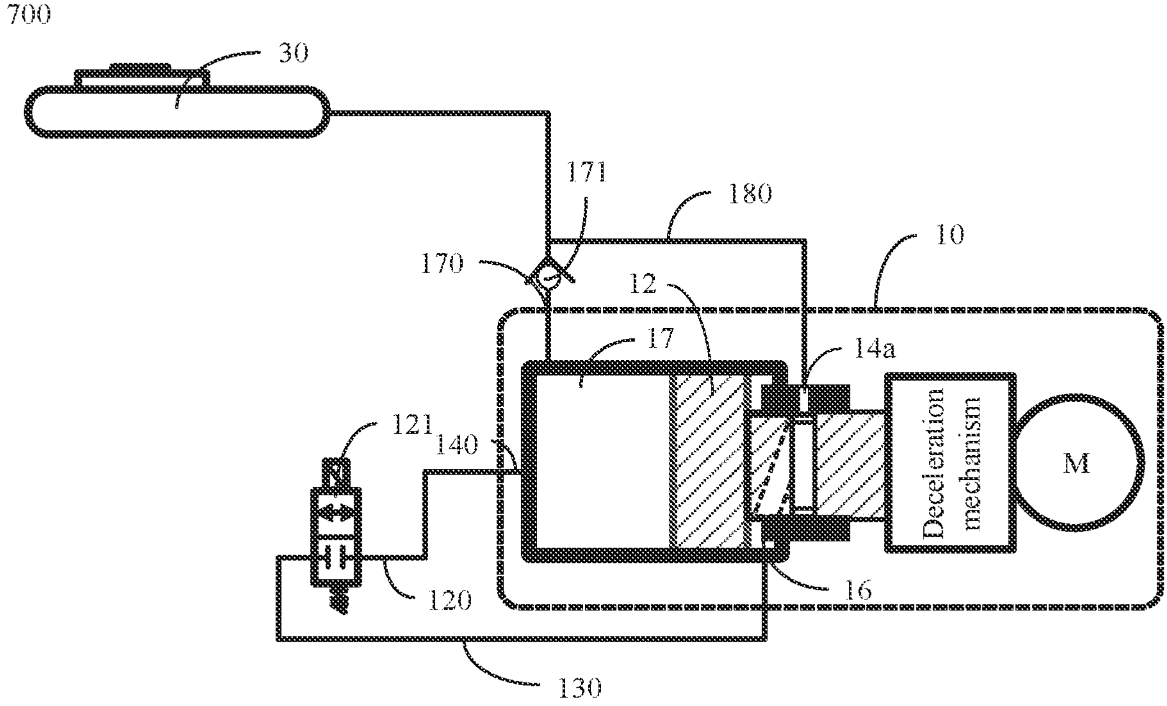
FIG. 7 is a schematic diagram of a connection manner 1 between a fluid storage apparatus and a hydraulic adjustment apparatus 10 according to an embodiment of this application.

FIG. 7 is a schematic diagram of a connection manner 1 between a fluid storage apparatus and a hydraulic adjustment apparatus 10 according to an embodiment of this application. In a hydraulic adjustment unit 700 shown in FIG. 7, the first inlet pipe is provided with a one-way valve 171, and the one-way valve 171 allows brake fluid in the first inlet pipe to flow from the fluid storage apparatus 30 to the second hydraulic chamber 17. A first hydraulic adjustment port (also referred to as an "outlet port") 14*a* in the first hydraulic chamber 16 is connected to a first outlet pipe 180.

Correspondingly, when a second control valve 121 is in a closed state, in a forward pressurization mode of the hydraulic adjustment apparatus 10, a part of the brake fluid in the second hydraulic chamber 17 flows into the dual circuit brake system and a part of the brake fluid in the second hydraulic chamber 17 flows into a third brake pipe 130 through the second control valve 121, and flows into the first hydraulic chamber 16 through the third brake pipe 130. In other words, an inlet pipe of the first hydraulic chamber 16 is the third brake pipe 130 in a forward pressurization process.

In a forward depressurization process, as a piston 12 moves forward, the brake fluid in the dual circuit brake system is pumped into the second hydraulic chamber 17. After the piston 12 moves to an inner stop point, the remaining brake fluid in the dual circuit brake system flows into the fluid storage apparatus 30 through the first outlet pipe 180.

Connection manner 2: The first hydraulic chamber 16 is provided with a second inlet pipe 190 connected to the fluid storage apparatus 30, and the second hydraulic chamber 17 is provided with a first inlet pipe 170 connected to the fluid storage apparatus 30.

Figure 8:
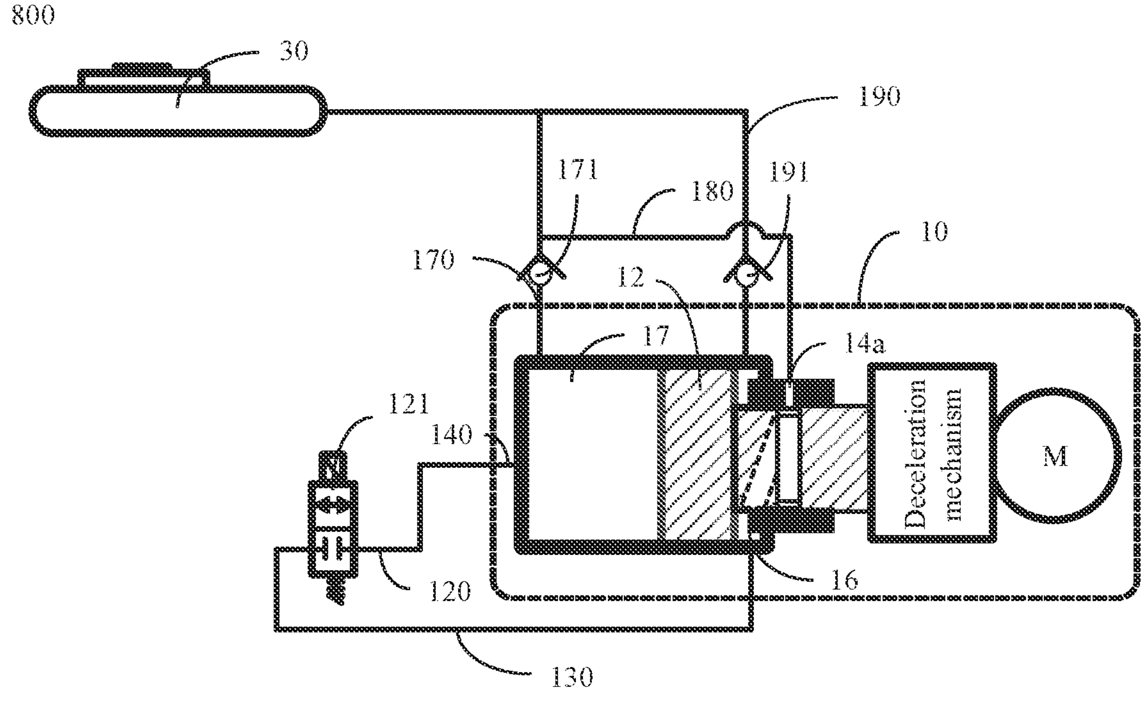
FIG. 8 is a schematic diagram of a connection manner 2 between a fluid storage apparatus and a hydraulic adjustment apparatus 10 according to an embodiment of this application.

FIG. 8 is a schematic diagram of a connection manner 2 between a fluid storage apparatus and a hydraulic adjustment apparatus 10 according to an embodiment of this application. In a hydraulic adjustment unit 800 shown in FIG. 8, the first inlet pipe is provided with a one-way valve 171, and the one-way valve 171 allows brake fluid in the first inlet pipe to flow from the fluid storage apparatus 30 to the second hydraulic chamber 17. A first hydraulic adjustment port (also referred to as an "outlet port") 14*a* in the first hydraulic chamber 16 is connected to a first outlet pipe 180.

The second inlet pipe 190 is provided with a one-way valve 191. The one-way valve 191 allows brake fluid in the second inlet pipe 190 to flow from the fluid storage apparatus 30 to the first hydraulic chamber 16, and prevents the brake fluid in the second inlet pipe 190 from flowing from the first hydraulic chamber 16 to the fluid storage apparatus 30.

Correspondingly, when a second control valve 121 is in a closed state, in a forward pressurization mode of the hydraulic adjustment apparatus 10, a part of the brake fluid in the second hydraulic chamber 17 flows into the dual circuit brake system and a part of the brake fluid in the second hydraulic chamber 17 flows into a third brake pipe 130 through the second control valve 121, and flows into the first hydraulic chamber 16 through the third brake pipe 130. In other words, an inlet pipe of the first hydraulic chamber 16 is the third brake pipe 130 in a forward pressurization process.

In a forward depressurization process, as a piston 12 moves forward, the brake fluid in the dual circuit brake system is pumped into the second hydraulic chamber 17. After the piston 12 moves to an inner stop point, the remaining brake fluid in the dual circuit brake system flows into the fluid storage apparatus 30 through the first outlet pipe 180.

A connection manner between the hydraulic adjustment apparatus 10 and a dual circuit brake pipe, and a connection manner between the hydraulic adjustment apparatus 10 and the fluid storage apparatus 30 are described above with reference to FIG. 2(*a*) and FIG. 2(*b*) to FIG. 8. The hydraulic adjustment units 400 to 600 shown above may be arbitrarily combined with the hydraulic adjustment units 700 and 800. A mechanism in which a braking force is provided by a hydraulic adjustment apparatus 10 in a brake system is described below by using a combination of the hydraulic adjustment unit 400 and the hydraulic adjustment unit 800, a combination of the hydraulic adjustment unit 500 and the hydraulic adjustment unit 800, and a combination of the hydraulic adjustment unit 600 and the hydraulic adjustment unit 800 as examples, respectively.

It should be noted that in the brake system shown below, a manual braking mode triggered by a driver by stepping on a brake pedal, a wire control braking mode triggered by a driver by stepping on a brake pedal, and a driverless braking mode in an automatic driving scenario can also be implemented. A principle of a braking process in the foregoing manual braking mode is similar to that of a braking process in a manual braking mode in an existing brake system. For brevity, details are not described again. The following mainly describes a bidirectional pressurization process and a bidirectional depressurization process of the pressure adjustment apparatus 10 in the wire control braking mode and the driverless braking mode.

Figure 9:
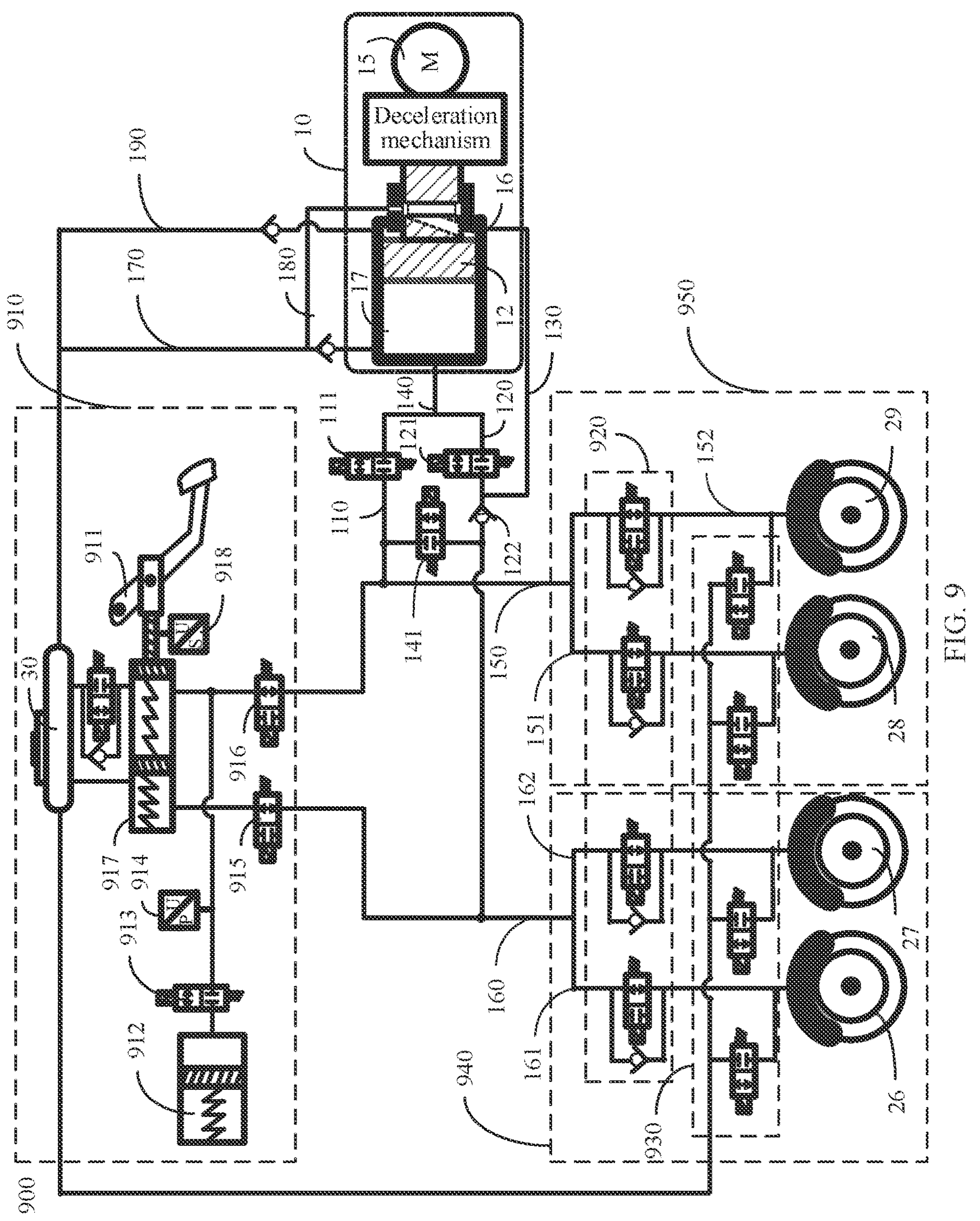
FIG. 9 is a schematic diagram of a hydraulic adjustment unit according to an embodiment of this application.

A hydraulic adjustment unit 900 formed by combining the hydraulic adjustment unit 400 and the hydraulic adjustment unit 800 is described below with reference to FIG. 9. FIG. 9 is a schematic diagram of a hydraulic adjustment unit according to an embodiment of this application. A function implemented by a master cylinder pressurization and adjustment unit 910 in the hydraulic adjustment unit 900 shown in FIG. 9 is a manual braking mode and a wire control braking mode requiring participation of a driver.

With the master cylinder pressurization and adjustment unit 910, the driver steps on a brake pedal 911 to cause brake fluid in a brake master cylinder 917 to flow into a pedal feel simulator 912 through a brake pipe in which a control valve 913 is located. In the wire control braking mode, a control valve 915 and a control valve 916 are in an open state, and correspondingly, a hydraulic adjustment apparatus 10 provides a braking force for a dual circuit brake system based on a pedal stroke detected by a pedal stroke sensor 918 or pressure of the brake fluid detected by a pressure sensor 914. In the manual braking mode, the control valve 915 and the control valve 916 are in a closed state, and the brake fluid provides a braking force for brake wheel cylinders 26, 27, 28, and 29 through a brake pipe 160 and a brake pipe 150.

For the pressure adjustment apparatus 10 in a bidirectional pressurization mode, a first control valve 111, a second control valve 121, a third control valve 141, and inlet valves 920 corresponding to the brake wheel cylinders 26, 27, 28, and 29 are in a closed state. The control valve 915, the control valve 916, and outlet valves 930 corresponding to the brake wheel cylinders 26, 27, 28, and 29 are in an open state.

In a forward pressurization process, a driving apparatus 15 drives a piston 12 to compress a volume of a second hydraulic chamber 17, to press brake fluid in the second hydraulic chamber 17 into the brake pipe 150 and the brake pipe 160 through a first brake pipe 110 and a second brake pipe 120 respectively, into the brake wheel cylinders 28 and 29 through the brake pipe 150, and into the brake wheel cylinders 26 and 27 through the brake pipe 160.

During the compressing of the volume of the second hydraulic chamber 17 by the piston 12, a part of the brake fluid may also enter a first hydraulic chamber 16 through a third brake pipe 130 to replenish the first hydraulic chamber 16, thereby reducing a driving force of the driving apparatus 15 to drive the piston 12. In addition, brake fluid in a fluid storage apparatus 30 may also enter the first hydraulic chamber 16 through a second oil inlet pipe 190, to replenish the first hydraulic chamber 16, thereby reducing the driving force of the driving apparatus 15 to drive the piston 12.

In a reverse pressurization process, the driving apparatus 15 drives the piston 12 to compress a volume of the first hydraulic chamber 16, to press a part of the brake fluid in the first hydraulic chamber 16 into the brake pipe 160 through the third brake pipe 130 and the second brake pipe 120, to provide a braking force for the second group of brake wheel cylinders 26 and 27.

The other part of the brake fluid in the first hydraulic chamber 16 enters the second brake pipe 120 through the third brake pipe 130 and the second brake pipe 120 that are in communication with each other, enters the first brake pipe 110 through the second control valve 121 and the first control valve 111, and provides a braking force for the first group of brake wheel cylinders 28 and 29 through the brake pipe 150.

In a process in which the brake fluid flows through the second control valve 121, a part of the brake fluid flows into the second hydraulic chamber 17 through a fourth brake pipe 140, to replenish the second hydraulic chamber 17, thereby reducing the driving force of the driving apparatus 15 to drive the piston 12. In addition, the brake fluid in the fluid storage apparatus 30 may also enter the second hydraulic chamber 17 through a first oil inlet pipe 170, to replenish the second hydraulic chamber 17, thereby reducing the driving force of the driving apparatus 15 to drive the piston 12.

For the pressure adjustment apparatus 10 in a bidirectional depressurization mode, the control valve 915, the control valve 916, the inlet valves 920 corresponding to the brake wheel cylinders 26, 27, 28, and 29, and the outlet valves 930 corresponding to the brake wheel cylinders 26, 27, 28, and 29 are in the open state, and the first control valve 111, the second control valve 121, and the third control valve 141 are in the closed state.

In a forward depressurization process, the driving apparatus 15 drives the piston 12 to compress the volume of the first hydraulic chamber 16, to pump the brake fluid in the brake wheel cylinders 26, 27, 28, and 29 into the second hydraulic chamber 17 through the first brake pipe 110. Because the second brake pipe 120 is provided with a first one-way valve 122, after being pumped into the second brake pipe 120, the brake fluid in the brake wheel cylinders 26, 27, 28, and 29 is blocked by the first one-way valve 122, and can flow to the first brake pipe 110 and into the second hydraulic chamber 17 only through the brake pipe in which the third control valve 141 is located.

After the piston 12 moves to an inner stop point, the volume of the second hydraulic chamber 17 is the largest. In this case, the second hydraulic chamber 17 cannot continue to accommodate the brake fluid, and the remaining brake fluid in the brake wheel cylinders 26, 27, 28, and 29 can continue to flow to the second control valve 121 through the first brake pipe 110, flow to the third brake pipe 130 through the second control valve 121, then flow into the second hydraulic chamber 17 through the third brake pipe 130, and flow into the fluid storage apparatus 30 through the first outlet pipe 180.

In a reverse depressurization process, the driving apparatus 15 drives the piston 12 to compress the volume of the second hydraulic chamber 17, to pump the brake fluid in the second group of brake wheel cylinders 26 and 27 through the second brake pipe 120 into the brake pipe in which the third control valve 141 is located, and then, the brake fluid flows through the brake pipe in which the third control valve 141 is located and flows into the third brake pipe 130 through the first control valve 111 and the second control valve 121. The brake fluid in the first group of brake wheel cylinders 28 and 29 is pumped into the first brake pipe 110, flows into the third brake pipe 130 through the first control valve 111 and the second control valve 121, and finally flows into the first hydraulic chamber 16 through the third brake pipe 130. After the piston 12 moves to an outer stop point, the volume of the first hydraulic chamber 16 is the largest, and the first hydraulic chamber 16 cannot continue to accommodate the brake fluid. In this case, the outlet valves 930 corresponding to the brake wheel cylinders 26, 27, 28, and 29 can be controlled to be in the closed state. The remaining brake fluid in the brake system can flow through the outlet valves 930 corresponding to the brake wheel cylinders 26, 27, 28, and 29 into the fluid storage apparatus 30 through a depressurization pipe.

For the pressure adjustment apparatus 10 in the bidirectional pressurization mode of single circuit braking, assuming that a braking circuit 940 fails, the pressure adjustment apparatus 10 is required to provide a braking force for a braking circuit 950.

In this case, the third control valve 141, the second control valve 121, the control valve 915, the control valve 916, and the outlet valves 930 corresponding to the brake wheel cylinders 26 and 27 are in the open state. The first control valve 111 and the outlet valves 930 corresponding to the brake wheel cylinders 28 and 29 are in the closed state.

In the forward pressurization process, the driving apparatus 15 drives the piston 12 to compress the volume of the second hydraulic chamber 17, to press the brake fluid in the second hydraulic chamber 17 into the brake pipe 150 through the first brake pipe 110 and into the brake wheel cylinders 28 and 29 through the brake pipe 150. Because the second control valve 121 and the third control valve 141 in the second brake pipe 120 are in the open state, the brake fluid in the second hydraulic chamber 17 cannot pass through the second brake pipe 120.

During the compressing of the volume of the second hydraulic chamber 17 by the piston 12, the volume of the first hydraulic chamber 16 increases, and a part of the brake fluid may also enter the first hydraulic chamber 16 through the third brake pipe 130, to replenish the first hydraulic chamber 16, thereby reducing the driving force of the driving apparatus 15 to drive the piston 12. In addition, brake fluid in a fluid storage apparatus 30 may also enter the first hydraulic chamber 16 through a second oil inlet pipe 190, to replenish the first hydraulic chamber 16, thereby reducing the driving force of the driving apparatus 15 to drive the piston 12.

For the pressure adjustment apparatus 10 in the bidirectional pressurization mode of single circuit braking, assuming that a braking circuit 950 fails, the pressure adjustment apparatus 10 is required to provide a braking force for a braking circuit 940. In this case, the third control valve 141, the first control valve 111, the control valve 915, the control valve 916, and the outlet valves 930 corresponding to the brake wheel cylinders 28, and 29 are in the open state. The second control valve 121 and the outlet valves 930 corresponding to the brake wheel cylinders 26 and 27 are in the closed state.

In a reverse pressurization process, the driving apparatus 15 drives the piston 12 to compress the volume of the second hydraulic chamber 17, to press the brake fluid in the second hydraulic chamber 17 into the brake pipe 160 through the second brake pipe 120 and into the brake wheel cylinders 26 and 27 through the brake pipe 160. Because the first control valve 111 and the third control valve 141 in the first brake pipe 110 are in the open state, the brake fluid in the second hydraulic chamber 17 cannot pass through the first brake pipe 110.

During the compressing of the volume of the second hydraulic chamber 17 by the piston 12, the volume of the first hydraulic chamber 16 increases, and the brake fluid in the fluid storage apparatus 30 may enter the first hydraulic chamber 16 through the second oil inlet pipe 190, to replenish the first hydraulic chamber 16, thereby reducing the driving force of the driving apparatus 15 to drive the piston 12.

Figure 10:
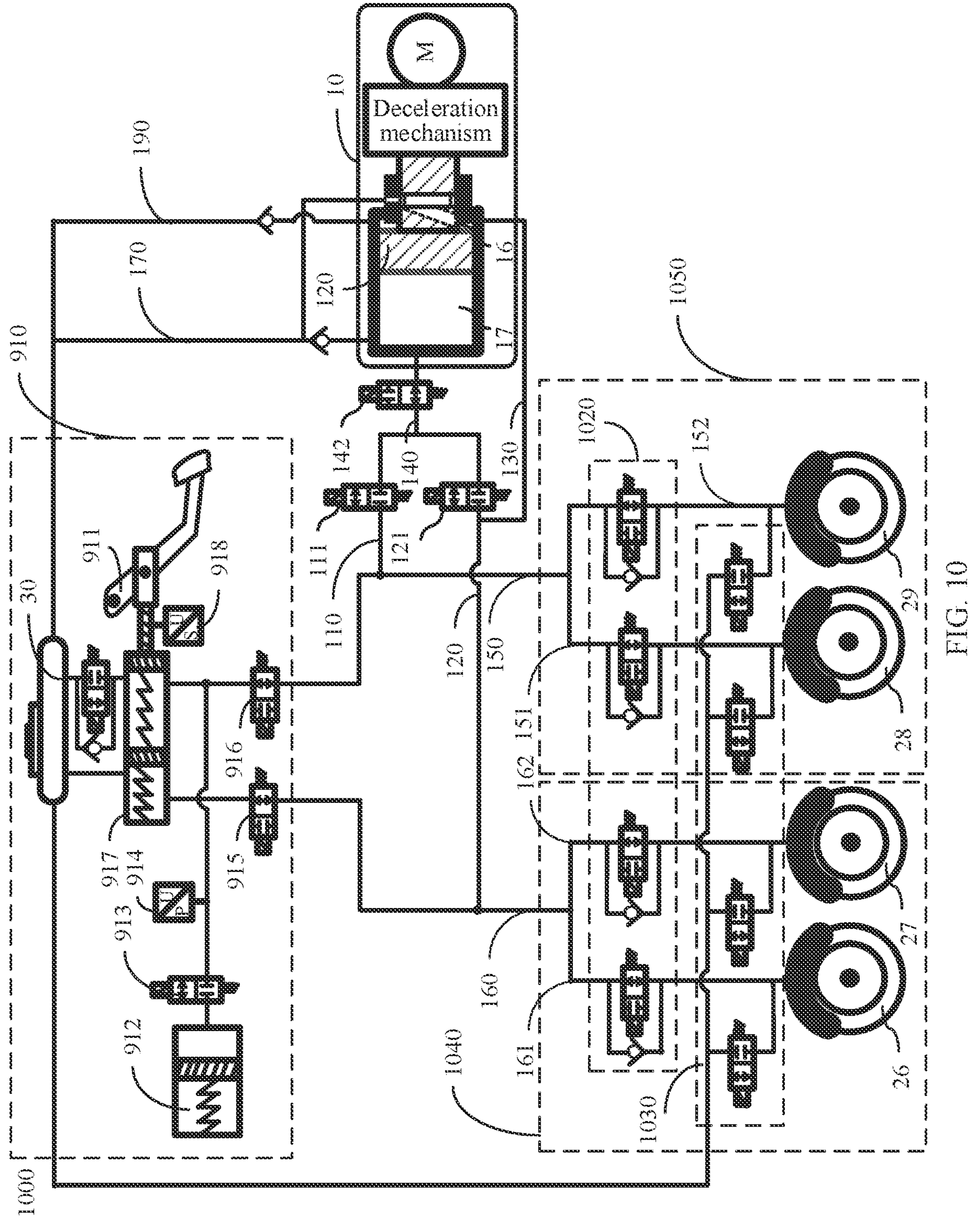
FIG. 10 is a schematic diagram of a hydraulic adjustment unit according to an embodiment of this application.

A hydraulic adjustment unit 1000 formed by combining the hydraulic adjustment unit 500 and the hydraulic adjustment unit 800 is described below with reference to FIG. 10, FIG. 10 is a schematic diagram of a hydraulic adjustment unit according to an embodiment of this application. A function implemented by a master cylinder pressurization and adjustment unit 910 in the hydraulic adjustment unit 1000 shown in FIG. 10 is the same as a function implemented by the hydraulic adjustment unit 900 shown in FIG. 9. For brevity, details are not described below.

The pressure adjustment apparatus 10 may be divided into a forward pressurization process and a reverse pressurization process in the bidirectional pressurization mode.

In the forward pressurization process, a first control valve 111, a second control valve 121, a fourth control valve 142, and inlet valves 1020 corresponding to brake wheel cylinders 26, 27, 28 and 29 are in a closed state. A control valve

915, a control valve 916, and outlet valves 1030 corresponding to the brake wheel cylinders 26, 27, 28 and 29 are in an open state.

A driving apparatus 15 drives a piston 12 to compress a volume of a second hydraulic chamber 17, to press brake fluid in the second hydraulic chamber 17 into a brake pipe 150 and a brake pipe 160 through a first brake pipe 110 and a second brake pipe 120 respectively, into the brake wheel cylinders 28 and 29 through the brake pipe 150, and into the brake wheel cylinders 26 and 27 through the brake pipe 160.

During the compressing of the volume of the second hydraulic chamber 17 by the piston 12, a part of the brake fluid may also enter a first hydraulic chamber 16 through a third brake pipe 130 to replenish the first hydraulic chamber 16, thereby reducing a driving force of the driving apparatus 15 to drive the piston 12. In addition, brake fluid in a fluid storage apparatus 30 may also enter the first hydraulic chamber 16 through a second oil inlet pipe 190, to replenish the first hydraulic chamber 16, thereby reducing the driving force of the driving apparatus is to drive the piston 12.

In the reverse pressurization process, the first control valve 111, the second control valve 121, and the inlet valves 1020 corresponding to the brake wheel cylinders 26, 27, 28, and 29 are in the closed state. The control valve 915, the control valve 916, the outlet valves 1030 corresponding to the brake wheel cylinders 26, 27, 28, and 29, and the fourth control valve 142 are in the open state.

The driving apparatus 15 drives the piston 12 to compress a volume of the first hydraulic chamber 16, to press a part of the brake fluid in the first hydraulic chamber 16 into the brake pipe 160 through the third brake pipe 130 and the second brake pipe 120, to provide a braking force for the second group of brake wheel cylinders 26 and 27.

The other part of the brake fluid in the first hydraulic chamber 16 enters the second brake pipe 120 through the third brake pipe 130 and the second brake pipe 120 that are in communication with each other, enters the first brake pipe 110 through the second control valve 121 and the first control valve 111, and provides a braking force for the first group of brake wheel cylinders 28 and 29 through the brake pipe 150. In a process in which the brake fluid flows through the second control valve 121, because the fourth control valve 142 is in the open state, the brake fluid is prevented from flowing into the second hydraulic chamber 17 through a fourth brake pipe 140.

In addition, the brake fluid in the fluid storage apparatus 30 may also enter the second hydraulic chamber 17 through a first oil inlet pipe 170, to replenish the second hydraulic chamber 17, thereby reducing the driving force of the driving apparatus 15 to drive the piston 12.

The pressure adjustment apparatus 10 may be divided into a forward pressurization process and a reverse pressurization process in the bidirectional depressurization mode.

In the forward depressurization process, the fourth control valve 142, the control valve 915, the control valve 916, the inlet valves 1020 corresponding to the brake wheel cylinders 26, 27, 28, and 29, and the outlet valves 1030 corresponding to the brake wheel cylinders 26, 27, 28, and 29 are in the open state. The first control valve 111 and the second control valve 121 are in the closed state.

The driving apparatus 15 drives the piston 12 to compress the volume of the first hydraulic chamber 16, to pump the brake fluid in the brake wheel cylinders 26, 27, 28 and 29 into the second hydraulic chamber 17 through the first brake pipe 110 and the second brake pipe 120 separately.

After the piston 12 moves to an inner stop point, the volume of the second hydraulic chamber 17 is the largest. In this case, the second hydraulic chamber 17 cannot continue to accommodate the brake fluid, and the remaining brake fluid in the first group of brake wheel cylinders 28 and 29 can continue to flow to the second control valve 121 through the first brake pipe 110, flow to the third brake pipe 130 through the second control valve 121, then flow into the second hydraulic chamber 17 through the third brake pipe 130, and flow into the fluid storage apparatus 30 through a first outlet pipe 180. The remaining brake fluid in the second group of brake wheel cylinders 26 and 27 can continue to flow to the third brake pipe 130 through the second brake pipe 120, flow into the second hydraulic chamber 16 through the third brake pipe 130, and flow into the fluid storage apparatus 30 through the first outlet pipe 180.

In a reverse depressurization process, the driving apparatus 15 drives the piston 12 to compress the volume of the second hydraulic chamber 17, to pump the brake fluid in the second group of brake wheel cylinders 26 and 27 into the third brake pipe 130 through the second brake pipe 120 and into the first hydraulic chamber 16 through the third brake pipe 130. The brake fluid in the first group of brake wheel cylinders 28 and 29 is pumped into the first brake pipe 110, flows into the third brake pipe 130 through the first control valve 111 and the second control valve 121, and finally flows into the first hydraulic chamber 16 through the third brake pipe 130. After the piston 12 moves to an outer stop point, the volume of the first hydraulic chamber 16 is the largest, and the first hydraulic chamber 16 cannot continue to accommodate the brake fluid. In this case, the outlet valves 1030 corresponding to the brake wheel cylinders 26, 27, 28, and 29 can be controlled to be in the closed state. The remaining brake fluid in the brake system can flow through the outlet valves 1030 corresponding to the brake wheel cylinders 26, 27, 28, and 29 into the fluid storage apparatus 30 through a depressurization pipe.

For the pressure adjustment apparatus 10 in the bidirectional pressurization mode of single circuit braking, assuming that a braking circuit 1040 fails, the pressure adjustment apparatus 10 is required to provide a braking force for a braking circuit 1050.

In this case, the second control valve 121, the control valve 915, the control valve 916, and the outlet valves 1030 corresponding to the brake wheel cylinders 26 and 27 are in the open state. The third control valve 141, the first control valve 111, and the outlet valves 1030 corresponding to the brake wheel cylinders 28 and 29 are in the closed state.

In the forward pressurization process, the driving apparatus 15 drives the piston 12 to compress the volume of the second hydraulic chamber 17, to press the brake fluid in the second hydraulic chamber 17 into the brake pipe 150 through the first brake pipe 110 and into the brake wheel cylinders 28 and 29 through the brake pipe 150. Because the second control valve 121 in the second brake pipe 120 is in the open state, the brake fluid in the second hydraulic chamber 17 cannot pass through the second brake pipe 120.

During the compressing of the volume of the second hydraulic chamber 17 by the piston 12, the volume of the first hydraulic chamber 16 increases, and the brake fluid in the fluid storage apparatus 30 may enter the first hydraulic chamber 16 through the second oil inlet pipe 190, to replenish the first hydraulic chamber 16, thereby reducing the driving force of the driving apparatus 15 to drive the piston 12.

For the pressure adjustment apparatus 10 in the bidirectional pressurization mode of single circuit braking, assuming that a braking circuit 1050 fails, the pressure adjustment apparatus 10 is required to provide a braking force for a braking circuit 1040. In this case, the first control valve 111, the control valve 915, the control valve 916, and the outlet valves 1030 corresponding to the brake wheel cylinders 28, and 29 are in the open state. The fourth control valve 142, the second control valve 121, and the outlet valves 1030 corresponding to the brake wheel cylinders 26 and 27 are in the closed state.

The driving apparatus 15 drives the piston 12 to compress the volume of the second hydraulic chamber 17, to press the brake fluid in the second hydraulic chamber 17 into the brake pipe 160 through the second brake pipe 120 and into the brake wheel cylinders 26 and 27 through the brake pipe 160. Because the first control valve 111 in the first brake pipe 110 is in the open state, the brake fluid in the second hydraulic chamber 17 cannot pass through the first brake pipe 110.

During the compressing of the volume of the second hydraulic chamber 17 by the piston 12, the volume of the first hydraulic chamber 16 increases, and the brake fluid in the fluid storage apparatus 30 may enter the first hydraulic chamber 16 through the second oil inlet pipe 190, to replenish the first hydraulic chamber 16, thereby reducing the driving force of the driving apparatus 15 to drive the piston 12. In addition, as the volume of the first hydraulic chamber 16 increases, a part of the brake fluid in the second brake pipe 120 may also enter the first hydraulic chamber 16 through the third brake pipe 130, to replenish the first hydraulic chamber 16, thereby reducing the driving force of the driving apparatus 15 to drive the piston 12.

Figure 11:
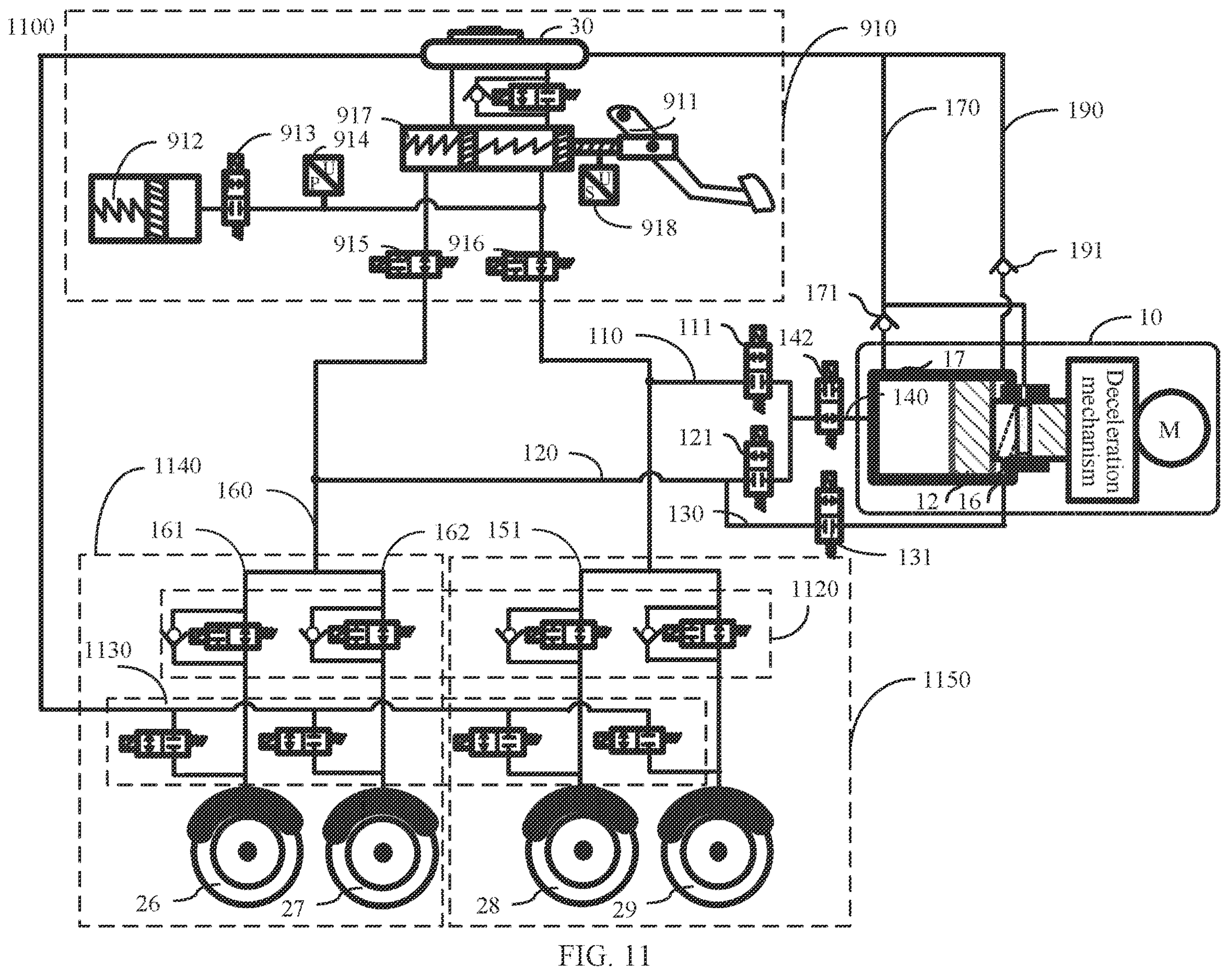
FIG. 11 is a schematic diagram of a hydraulic adjustment unit according to an embodiment of this application.

A hydraulic adjustment unit 1100 formed by combining the hydraulic adjustment unit 600 and the hydraulic adjustment unit 800 is described below with reference to FIG. 11. FIG. 11 is a schematic diagram of a hydraulic adjustment unit according to an embodiment of this application. A function implemented by a master cylinder pressurization and adjustment unit 910 in the hydraulic adjustment unit 1100 shown in FIG. 11 is the same as a function implemented by the hydraulic adjustment unit 900 shown in FIG. 9. For brevity, details are not described below.

The pressure adjustment apparatus 10 may be divided into a forward pressurization process and a reverse pressurization process in the bidirectional pressurization mode.

In the forward pressurization process, a first control valve 111, a second control valve 121, a fourth control valve 142, and inlet valves 1120 corresponding to brake wheel cylinders 26, 27, 28, and 29 are in a closed state. A fifth control valve 131, a control valve 915, a control valve 916, and outlet valves 1130 corresponding to the brake wheel cylinders 26, 27, 28, and 29 are in an open state.

A driving apparatus 15 drives a piston 12 to compress a volume of a second hydraulic chamber 17, to press brake fluid in the second hydraulic chamber 17 into a brake pipe 150 and a brake pipe 160 through a first brake pipe 110 and a second brake pipe 120 respectively, into the brake Wheel cylinders 28 and 29 through the brake pipe 150, and into the brake wheel cylinders 26 and 27 through the brake pipe 160.

During the compressing of the volume of the second hydraulic chamber 17 by the piston 12, brake fluid in a fluid storage apparatus 30 may enter a first hydraulic chamber 16 through a second oil inlet pipe 190, to replenish the first hydraulic chamber 16, thereby reducing a driving force of the driving apparatus 15 to drive the piston 12. In addition, because the fifth control valve 131 is in the open state, brake fluid in the second brake pipe 120 cannot enter the first hydraulic chamber 16 through a third brake pipe 130.

In the reverse pressurization process, the first control valve 111, the second control valve 121, the fifth control valve 131, and the inlet valves 1120 corresponding to the brake wheel cylinders 26, 27, 28, and 29 are in the closed state. The control valve 915, the control valve 916, the outlet valves 1130 corresponding to the brake wheel cylinders 26, 27, 28, and 29, and the fourth control valve 142 are in the open state.

The driving apparatus 15 drives the piston 12 to compress a volume of the first hydraulic chamber 16, to press a part of the brake fluid in the first hydraulic chamber 16 into the brake pipe 160 through the third brake pipe 130 and the second brake pipe 120, to provide a braking force for the second group of brake wheel cylinders 26 and 27.

The other part of the brake fluid in the first hydraulic chamber 16 enters the second brake pipe 120 through the third brake pipe 130 and the second brake pipe 120 that are in communication with each other, enters the first brake pipe 110 through the second control valve 121 and the first control valve 111, and provides a braking force for the first group of brake wheel cylinders 28 and 29 through the brake pipe 150. In a process in which the brake fluid flows through the second control valve 121, because the fourth control valve 142 is in the open state, the brake fluid is prevented from flowing into the second hydraulic chamber 17 through a fourth brake pipe 140.

In addition, the brake fluid in the fluid storage apparatus 30 may also enter the second hydraulic chamber 17 through a first oil inlet pipe 170, to replenish the second hydraulic chamber 17, thereby reducing the driving force of the driving apparatus 15 to drive the piston 12.

The pressure adjustment apparatus 10 may be divided into a forward pressurization process and a reverse pressurization process in the bidirectional depressurization mode.

In the forward depressurization process, the fourth control valve 142, the control valve 915, the control valve 916, the inlet valves 1120 corresponding to the brake wheel cylinders 26, 27, 28, and 29, and the outlet valves 1130 corresponding to the brake wheel cylinders 26, 27, 28, and 29 are in the open state. The fifth control valve 131, the first control valve 111, and the second control valve 121 are in the closed state.

The driving apparatus 15 drives the piston 12 to compress the volume of the first hydraulic chamber 16, to pump the brake fluid in the brake wheel cylinders 26, 27, 28 and 29 into the second hydraulic chamber 17 through the first brake pipe 110 and the second brake pipe 120 separately.

After the piston 12 moves to an inner stop point, the volume of the second hydraulic chamber 17 is the largest. In this case, the second hydraulic chamber 17 cannot continue to accommodate the brake fluid, and the remaining brake fluid in the first group of brake wheel cylinders 28 and 29 can continue to flow to the second control valve 121 through the first brake pipe 110, and flow to the third brake pipe 130 through the second control valve 121. Because the fifth control valve 131 is in the closed state, the brake fluid can flow into the second hydraulic chamber 17 through the third brake pipe 130, and flow into the fluid storage apparatus 30 through a first outlet pipe 180. The remaining brake fluid in the second group of brake wheel cylinders 26 and 27 can continue to flow to the third brake pipe 130 through the second brake pipe 120, flow into the second hydraulic chamber 17 through the third brake pipe 130, and flow into the fluid storage apparatus 30 through the first outlet pipe 180.

In a reverse depressurization process, the driving apparatus 15 drives the piston 12 to compress the volume of the second hydraulic chamber 17, to pump the brake fluid in the second group of brake wheel cylinders 26 and 27 into the third brake pipe 130 through the second brake pipe 120 and into the first hydraulic chamber 16 through the third brake pipe 130. The brake fluid in the first group of brake wheel cylinders 28 and 29 is pumped into the first brake pipe 110, flows into the third brake pipe 130 through the first control valve 111 and the second control valve 121, and finally flows into the first hydraulic chamber 16 through the third brake pipe 130. After the piston 12 moves to an outer stop point, the volume of the first hydraulic chamber 16 is the largest, and the first hydraulic chamber 16 cannot continue to accommodate the brake fluid. In this case, the outlet valves 1130 corresponding to the brake wheel cylinders 26, 27, 28, and 29 can be controlled to be in the closed state. The remaining brake fluid in the brake system can flow through the outlet valves 1130 corresponding to the brake wheel cylinders 26, 27, 28, and 29 into the fluid storage apparatus 30 through a depressurization pipe.

For the pressure adjustment apparatus 10 in the bidirectional pressurization mode of single circuit braking, assuming that a braking circuit 1140 fails, the pressure adjustment apparatus 10 is required to provide a braking force for a braking circuit 1150.

In this case, the second control valve 121, the control valve 915, the control valve 916, the outlet valves 1130 corresponding to the brake wheel cylinders 26 and 27, and the fifth control valve 131 are in the open state. The third control valve 141, the first control valve 111, and the outlet valves 1130 corresponding to the brake wheel cylinders 28 and 29 are in the closed state.

In the forward pressurization process, the driving apparatus 15 drives the piston 12 to compress the volume of the second hydraulic chamber 17, to press the brake fluid in the second hydraulic chamber 17 into the brake pipe 150 through the first brake pipe 110 and into the brake wheel cylinders 28 and 29 through the brake pipe 150. Because the second control valve 121 in the second brake pipe 120 is in the open state, the brake fluid in the second hydraulic chamber 17 cannot pass through the second brake pipe 120.

During the compressing of the volume of the second hydraulic chamber 17 by the piston 12, the volume of the first hydraulic chamber 16 increases, and the brake fluid in the fluid storage apparatus 30 may enter the first hydraulic chamber 16 through the second oil inlet pipe 190, to replenish the first hydraulic chamber 16, thereby reducing the driving force of the driving apparatus 15 to drive the piston 12.

For the pressure adjustment apparatus 10 in the bidirectional pressurization mode of single circuit braking, assuming that a braking circuit 1150 fails, the pressure adjustment apparatus 10 is required to provide a braking force for a braking circuit 1140.

In this case, the first control valve 111, the control valve 915, the control valve 916, the outlet valves 1130 corresponding to the brake wheel cylinders 26, 27, 28, and 29, and the fifth control valve 131 are in the open state. The fourth control valve 142, the second control valve 121, and the outlet valves 1130 corresponding to the brake wheel cylinders 26 and 27 are in the closed state.

The driving apparatus 15 drives the piston 12 to compress the volume of the second hydraulic chamber 17, to press the brake fluid in the second hydraulic chamber 17 into the brake pipe 160 through the second brake pipe 120 and into the brake wheel cylinders 26 and 27 through the brake pipe 160. Because the first control valve 111 in the first brake pipe 110 is in the open state, the brake fluid in the second hydraulic chamber 17 cannot pass through the first brake pipe 110.

During the compressing of the volume of the second hydraulic chamber 17 by the piston 12, the volume of the first hydraulic chamber 16 increases, and the brake fluid in the fluid storage apparatus 30 may enter the first hydraulic chamber 16 through the second oil inlet pipe 190, to replenish the first hydraulic chamber 16, thereby reducing the driving force of the driving apparatus 15 to drive the piston 12. In addition, because the fifth control valve 131 is in the open state, the brake fluid in the second brake pipe 120 cannot enter the first hydraulic chamber 16 through the third brake pipe 130 thereby helping improve efficiency of the pressure adjustment apparatus 10 in providing the braking force for the braking circuit 1140.

The hydraulic adjustment apparatus and the hydraulic adjustment unit provided in the embodiments of this application are described above with reference to FIG. 1 to FIG. 11. The control method provided in the embodiments of this application is described below with reference to FIG. 12 and FIG. 13A and FIG. 13B. It should be understood that the solutions provided in the embodiments of this application may be used in cooperation with any one of the foregoing hydraulic adjustment units, or the method of this application may be further applied to a brake system including any one of the foregoing hydraulic adjustment units.

FIG. 12 is a flowchart of a control method according to an embodiment of this application. The method shown in FIG. 12 includes step 1210 to step 1220.

1210: A controller generates a control instruction, where the control instruction is used to control a driving apparatus 15.

1220: The controller sends the control instruction to the driving apparatus 15, and controls the driving apparatus 15 to drive a piston 12 to move along an inner wall of a hydraulic cylinder 11, to increase or decrease pressure of brake fluid in a first group of brake wheel cylinders 28 and 29 and/or a second group of brake wheel cylinders 26 and 27.

Optionally, in an embodiment, the method further includes: When a braking circuit for providing a braking force for the first group of brake wheel cylinders 28 and 29 fails, and the first hydraulic chamber 16 is required to provide a braking force for the second group of brake wheel cylinders 26 and 27, the controller controls both a first control valve 111 and the second control valve 121 to be in an open state.

In this embodiment of this application, after the braking circuit for providing the braking force for the first group of brake wheel cylinders 28 and 29 fails, the first control valve 111 and the second control valve 121 may be open, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing a braking force for the first group of brake wheel cylinders 28 and 29 fails, and the first hydraulic chamber 16 is required to provide a braking force for the second group of brake wheel cylinders 26 and 27, the controller controls both a first control valve 111 and the second control valve 121 to be in an open state and the fourth control valve 142 to be in the open state.

In this embodiment of this application, after the braking circuit for providing the braking force for the first group of brake wheel cylinders 28 and 29 fails, the first control valve 111, the second control valve 121, and the fourth control valve 142 may be open, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls both the first control valve 111 and the second control valve 121 to be in an open state and the fifth control valve 131 to be in a closed state.

In this embodiment of this application, after the braking circuit for providing the braking force for the first group of brake wheel cylinders 28 and 29 fails, the first control valve 111 and the second control valve 121 may be open, the fifth control valve 131 is controlled to be closed, and the braking force is provided by the first hydraulic chamber 16 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the second group of brake wheel cylinders 26 and 27, the controller sends the control instruction to the driving apparatus 15, and controls the driving apparatus 15 to drive the piston 12 to compress a volume of the first hydraulic chamber 16, to press the brake fluid in the first hydraulic chamber 16 into the second group of brake wheel cylinders 26 and 27 through the second brake pipe 120, to increase the pressure of the brake fluid in the second group of brake wheel cylinders 26 and 27.

In this embodiment of this application, after the braking circuit for providing the braking force for the first group of brake wheel cylinders 28 and 29 fails, the controller controls the piston 12 to compress the volume of the first hydraulic chamber 16 to pressurize the second group of brake wheel cylinders 26 and 27 through the brake fluid in the first hydraulic chamber 16, that is, depressurization is performed on the second group of brake wheel cylinders 26 and 27 individually to improve safety of the brake system.

Optionally, in an embodiment, the method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls the first control valve 111 to be in an open state and controls the second control valve 121 to be in a closed state.

In this embodiment of this application, after the braking circuit for providing the braking force for the first group of brake wheel cylinders 28 and 29 fails, the first control valve 111 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls the first control valve 111 to be in an open state and controls the second control valve 121 and the fourth control valve 142 to be in a closed state.

In this embodiment of this application, after the braking circuit for providing the braking, force for the first group of brake wheel cylinders 28 and 29 fails, the first control valve 111 may be open, the second control valve 121 and the fourth control valve 142 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the first hydraulic chamber 16 is required to provide the braking force for the second group of brake wheel cylinders 26 and 27, the controller controls the second control valve 121 to be in an open state and controls the first control valve 111 and the fifth control valve 131 to be in the open state.

In this embodiment of this application, after the braking circuit for providing the braking force for the first group of brake wheel cylinders 28 and 29 fails, the first control valve 111 and the fifth control valve 131 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the second group of brake wheel cylinders 26 and 27, the controller sends the control instruction to the driving apparatus 15, and controls the driving apparatus 15 to drive the piston 12 to compress a volume of the second hydraulic chamber 17, to press the brake fluid in the second hydraulic chamber 17 into the second group of brake wheel cylinders 26 and 27 through the second brake pipe 120, to increase the pressure of the brake fluid in the second group of brake wheel cylinders 26 and 27.

In this embodiment of this application, after the braking circuit for providing the braking force for the first group of brake wheel cylinders 28 and 29 fails, the controller controls the piston 12 to compress the volume of the second hydraulic chamber 17 to pressurize the second group of brake wheel cylinders 26 and 27 through the brake fluid in the second hydraulic chamber 17, that is, pressurization is performed on the second group of brake wheel cylinders 26 and 27 individually to improve safety of the brake system.

Optionally, in an embodiment, the method further includes: When a braking circuit for providing the braking force for the second group of brake wheel cylinders 26 and 27 fails, and the second hydraulic chamber 17 is required to provide the braking force for the first group of brake wheel cylinders 28 and 29, the controller controls the first control valve 111 to be in an open state and controls the second control valve 121 to be in a closed state.

In this embodiment of this application, after the braking circuit for providing the braking force for the second group of brake wheel cylinders 26 and 27 fails, the first control valve 111 may be open, the second control valve 121 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the brake system further includes a fourth brake pipe 140. The second hydraulic chamber 17 is connected to a first end of the fourth brake pipe 140. A second end of the fourth brake pipe 140 is connected to a first end of the second control valve 121. The fourth brake pipe 140 is provided with a fourth control valve 142 to control closing or opening of the fourth brake pipe 140. The method further includes: When a braking circuit for providing the braking force for the second group of brake wheel cylinders 26 and 27 fails, and the second hydraulic chamber 17 is required to provide the braking force for the first group of brake wheel cylinders 28 and 29, the controller controls the second control valve 121 to be in an open state and controls the first control valve 111 and the fourth control valve 142 to be in a closed state.

In this embodiment of this application, after the braking circuit for providing the braking force for the second group of brake wheel cylinders 26 and 27 fails, the second control valve 121 may be open, the first control valve 111 and the fourth control valve 142 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, the third brake pipe 130 is provided with a fifth control valve 131, and the fifth control valve 131 controls closing or opening of the third brake pipe 130. The method further includes: When a braking circuit for providing the braking force for the first group of brake wheel cylinders 28 and 29 fails, and the second hydraulic chamber 17 is required to provide the braking force for the second group of brake wheel cylinders 26 and 27, the controller controls both the first control valve 111 and the fifth control valve 131 to be in a closed state and the second control valve 121 to be in an open state.

In this embodiment of this application, after the braking circuit for providing the braking force for the second group of brake wheel cylinders 26 and 27 fails, the second control valve 121 may be open, the first control valve 111 and the fifth control valve 131 may be closed, and the braking force is provided by the second hydraulic chamber 17 for the second group of brake wheel cylinders 26 and 27, thereby helping improve pressurization efficiency of the brake system, and avoiding pressure leakage of the brake fluid caused by the brake fluid flowing into the failed braking circuit.

Optionally, in an embodiment, that the controller sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27 includes: In a process of providing the braking force for the first group of brake wheel cylinders 28 and 29, the controller sends the control instruction to the driving apparatus 15, and controls the driving apparatus 15 to drive the piston 12 to compress a volume of the second hydraulic chamber 17, to press the brake fluid in the second hydraulic chamber 17 into the first group of brake wheel cylinders 28 and 29 through the first brake pipe 110, to increase the pressure of the brake fluid in the first group of brake wheel cylinders 28 and 29.

In this embodiment of this application, after the braking circuit for providing the braking force for the second group of brake wheel cylinders 26 and 27 fails, the controller controls the piston 12 to compress the volume of the second hydraulic chamber 17 to pressurize the first group of brake wheel cylinders 28 and 29 through the brake fluid in the second hydraulic chamber 17, that is, pressurization is performed on the first group of brake wheel cylinders 28 and 29 individually to improve safety of the brake system.

Figure 13A:
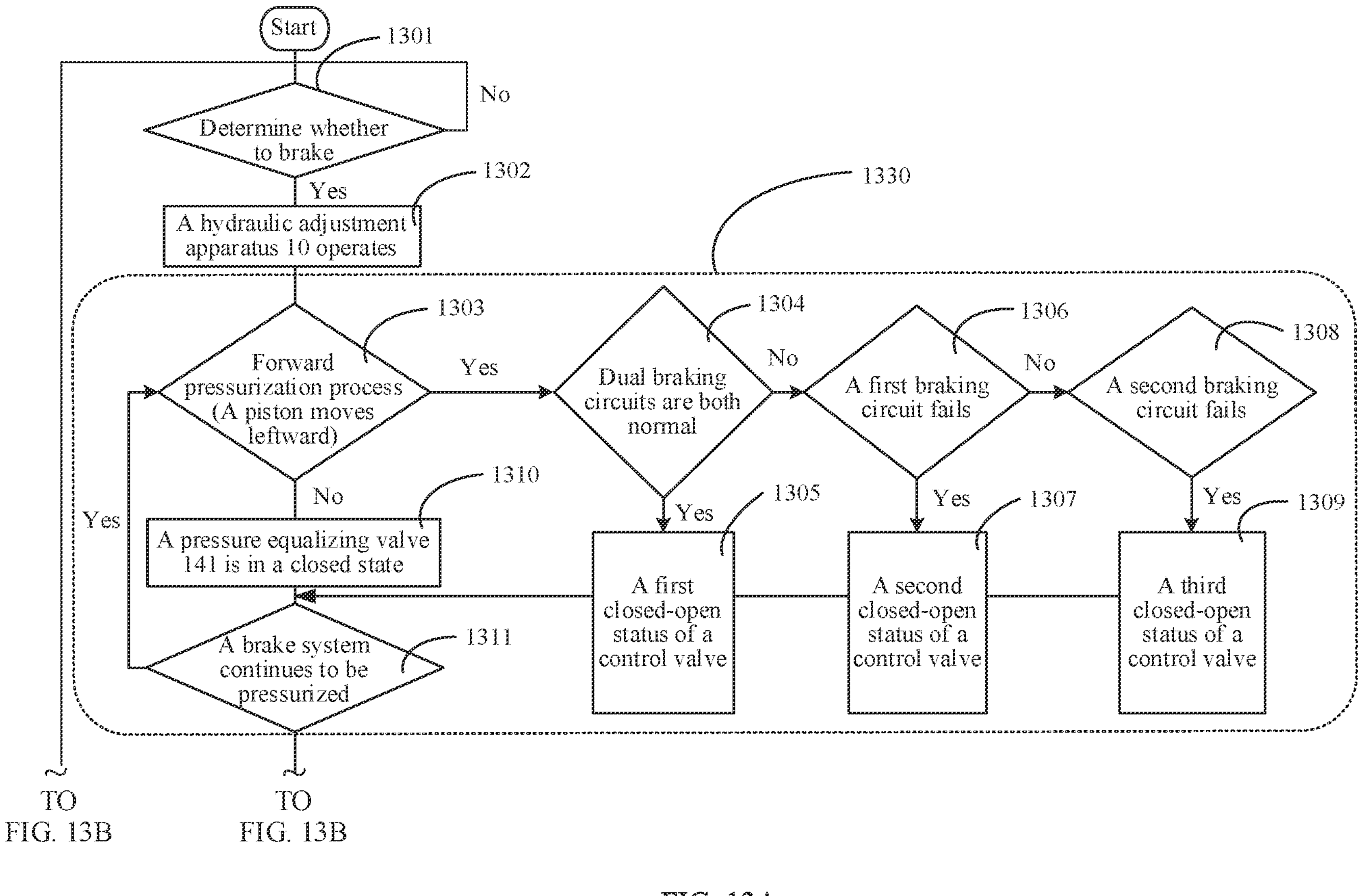
FIG. 13A and FIG. 13B are a flowchart of a control method according to another embodiment of this application.
Figure 13B:
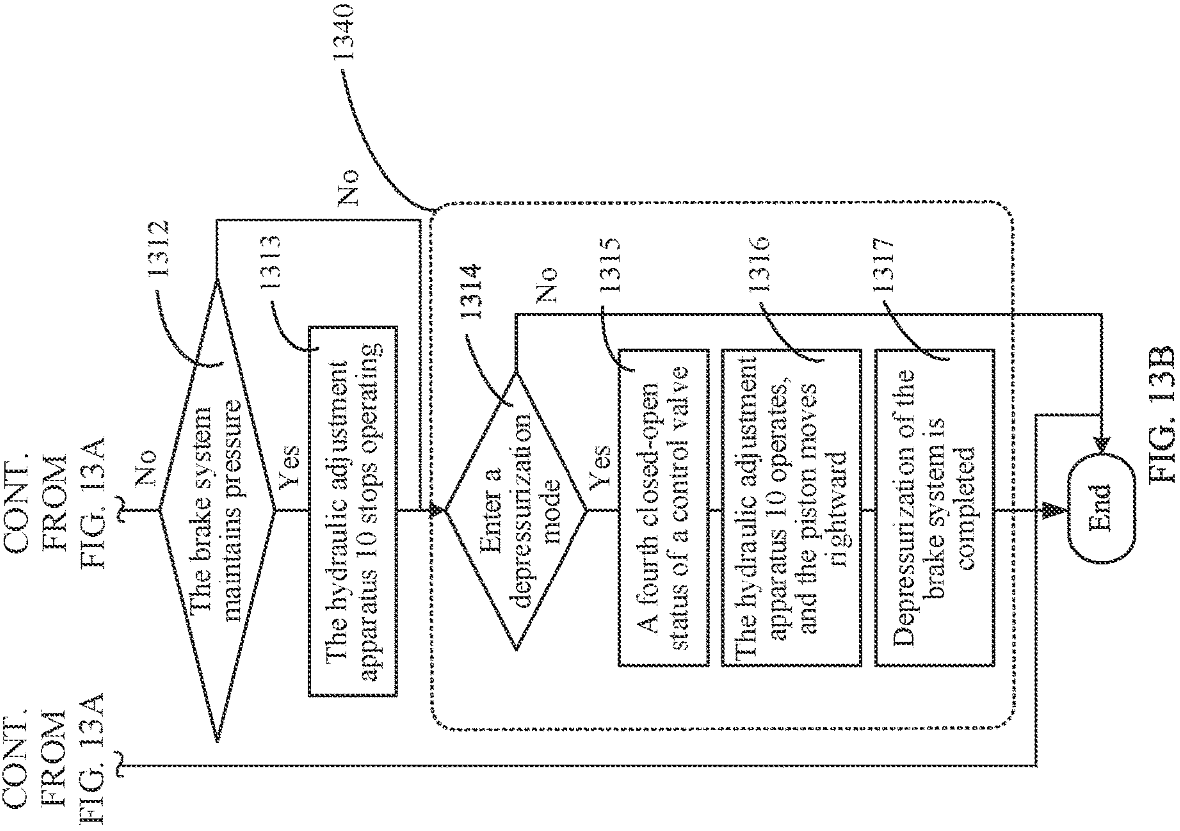

For ease of understanding, the following describes in detail the control method in this embodiment of this application with reference to FIG. 13A and FIG. 13B. For ease of description, the braking circuit for providing the braking force for the first group of brake wheel cylinders 28 and 29 is referred to as a "first braking circuit", for example, the braking circuit 950, the braking circuit 1050, or the braking circuit 1150 shown in FIG. 9 to FIG. 11. The braking circuit for providing the braking force for the second group of brake wheel cylinders 26 and 27 is referred to as a "second braking circuit", for example, the braking circuit 940, the braking circuit 1040, or the braking circuit 1140 shown in FIG. 9 to FIG. 11.

FIG. 13A and FIG. 13B are a flowchart of a control method according to another embodiment of this application. The method shown in FIG. 13A and FIG. 13B includes step 1301 to step 1317.

1301: A controller determines whether a brake system needs to be braked. If the brake system needs to be braked, step 1302 is performed. If the brake system does not need to be braked, a braking procedure ends.

1302: A hydraulic adjustment apparatus 10 is powered on and enters an operating state, or the hydraulic adjustment apparatus 10 enters a pressurization mode.

1303: Determine whether the hydraulic adjustment apparatus 10 enters a forward pressurization process. If it is determined that the hydraulic adjustment apparatus 10 enters the forward pressurization process, step 1304 is performed. If it is determined that the hydraulic adjustment apparatus 10 does not enter the forward pressurization process, step 1310 is performed to control a pressure equalizing valve 141 to be in a closed state, to maintain pressure balance of brake fluid in a first braking circuit and a second braking circuit.

Specifically, a piston 12 in the hydraulic adjustment apparatus 10 moves leftward, to compress a volume of a second hydraulic chamber 17 in the hydraulic adjustment apparatus 10.

304: The hydraulic adjustment apparatus 10 determines whether dual braking circuits in the brake system both operate normally. If the duel braking circuits both operate normally, step 1305 is performed. If a circuit of the dual braking circuits fails, step 1306 is performed.

1305: The controller controls a control valve in the brake system to be in a first closed-open status, and performs step 1311.

1306: Determine whether the first braking circuit fails. If the first braking circuit fails, step 1307 is performed. If the first braking circuit does not fail, step 1308 is performed.

1307: The controller controls a control valve in the brake system to be in a second closed-open status, and performs step 1311.

1308: Determine whether the second braking circuit fails. If the second braking circuit fails, step 1309 is performed.

1309: The controller controls a control valve in the brake system to be in a third closed-open status, and performs step 1311.

1311: The controller determines whether the brake system continues to be pressurized. If the controller determines that the brake system needs to continue to be pressurized, step 1303 is performed again. If the controller determines that the brake system does not need to continue to be pressurized, step 1312 is performed again.

1312: The controller determines whether the brake system enters a pressure maintaining mode. If the controller determines that the brake system needs to enter the pressure maintaining mode, step 1313 is performed. If the controller determines that the brake system does not need to enter the pressure maintaining mode, step 1314 is performed.

1313: The controller controls the hydraulic adjustment apparatus 10 to stop operating.

1314: The controller determines whether the brake system enters a depressurization mode. If the controller determines that the brake system needs to enter the depressurization mode, step 1315 is performed. If the controller determines that the brake system does not need to enter the depressurization mode, a braking procedure ends.

1315: The controller controls a control valve in the brake system to be in a fourth closed-open status.

1316: The controller controls the hydraulic adjustment apparatus 10 to enter a forward depressurization mode. For example, the controller controls the piston 12 of the hydraulic adjustment apparatus 10 to move rightward, to compress a volume of a first hydraulic chamber 16.

1317: The controller determines that depressurization of the brake system is completed.

It should be noted that, the first closed-open status to the fourth closed-open status are slightly different in different hydraulic adjustment units, and closed-open statuses of control valves for different hydraulic adjustment units have been described in detail above, and for brevity, details are not described herein again.

It should be further noted that, in the foregoing bidirectional depressurization process, the hydraulic adjustment apparatus may perform only one depressurization process. For example, the hydraulic adjustment apparatus may perform only forward depressurization, and does not implement a reverse depressurization mode. This is not limited in the embodiments of this application.

The control method in the embodiments of this application is described above with reference to FIG. 12 and FIG. 13A and FIG. 13B. A control apparatus for performing the foregoing control method is described below with reference to FIG. 14 and FIG. 15. It should be noted that the apparatus in the embodiments of this application may be applied to any hydraulic adjustment unit or brake system described above, to implement any control method described above. For brevity, details are not described herein again.

Figure 14:
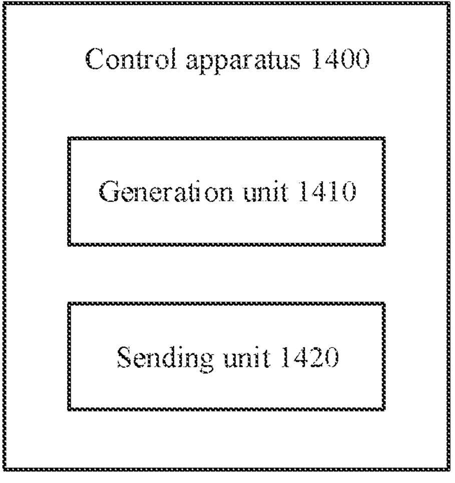
FIG. 14 is a schematic diagram of a control apparatus according to an embodiment of this application.

FIG. 14 is a schematic diagram of a control apparatus according to an embodiment of this application. The control apparatus 1400 shown in FIG. 14 includes a generation unit 1410 and a sending unit 1420.

The generation unit 1410 generates a control instruction. The control instruction is used to control the driving apparatus 15.

The sending unit 1420 sends the control instruction to the driving apparatus 15, and controls the driving apparatus 15 to drive the piston 12 to move along an inner wall of the hydraulic cylinder 11, to increase or decrease pressure of brake fluid in the first group of brake wheel cylinders 28 and 29 and/or the second group of brake wheel cylinders 26 and 27.

Figure 15:
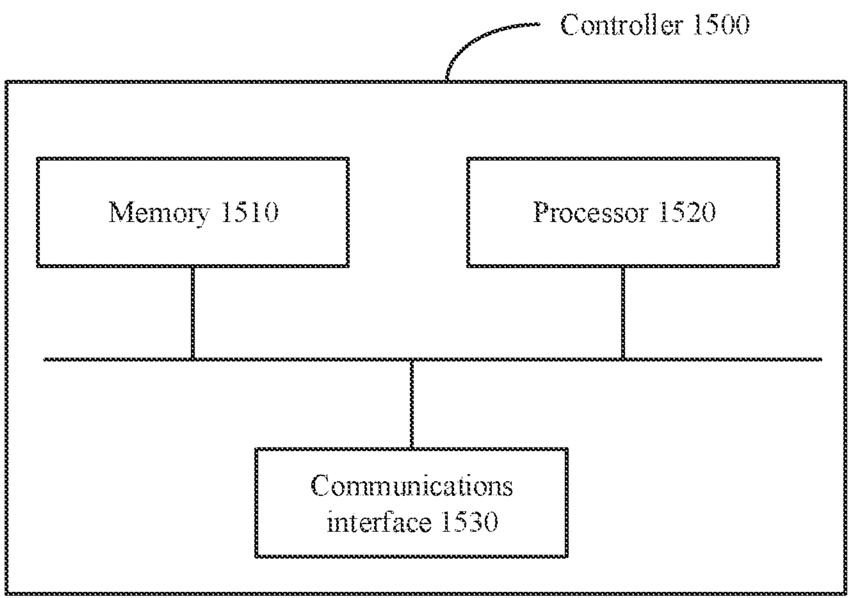
FIG. 15 is a schematic block diagram of a controller according to another embodiment of this application.

In an optional embodiment, the generation unit 1410 may be a processor 1520, the sending unit 1420 may be a communications interface 1530, and a specific structure of the controller is shown in FIG. 15.

FIG. 15 is a schematic block diagram of a controller according to another embodiment of this application. The controller 1500 shown in FIG. 15 may include a memory 1510, a processor 1520, and a communications interface 1530. The memory 1510, the processor 1520, and the communications interface 1530 are connected by using an internal connection path. The memory 1510 is configured to store instructions. The processor 1520 is configured to execute the instructions stored in the memory 1510, to control the communications interface 1530 to receive/send information. Optionally, the memory 1510 may be coupled to the processor 1520 by using an interface, or may be integrated together with the processor 1520.

It should be noted that, the communications interface 1530 uses an apparatus such as but not limited to an input/output interface (input/output interface), to implement communication between the controller 1500 and another device or a communications network.

In an implementation process, steps in the foregoing methods can be implemented by using a hardware integrated logical circuit in the processor 1520, or by using instructions in a form of software. The method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1510, and the processor 1520 reads information in the memory 1510 and completes the steps in the foregoing methods in combination with the hardware of the processor. To avoid repetition, details are not described herein again.

It should be understood that, the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should also be understood that in the embodiments of this application, the memory may include a read-only memory and a random access memory, and provide an instruction and data for the processor. A part of the processor may further include a non-volatile random access memory. For example, the processor may further store information of a device type.

In the embodiments of this application, “first”, “second”, and various numeric numbers are merely used for distinguishing for ease of description and are not intended to limn the scope of the embodiments of this application. For example, “first”, “second”, and various numeric numbers are used for distinguishing between different pipes, through holes, and the like.

It should be understood that the term “and/or” in this specification describes only an association relationship for describing associated objects and represents that three relationships may exist. For example, A and/or B may represent the following three cases: Only A exists, both A and B exist, and only B exists. In addition, the character “/” in this specification generally indicates an “or” relationship between the associated objects.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing, to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hydraulic adjustment unit in a brake system, wherein the hydraulic adjustment unit comprises:

a hydraulic adjustment apparatus having a bidirectional pressurization function, wherein the hydraulic adjustment apparatus comprises a first hydraulic chamber and a second hydraulic chamber, wherein:

the second hydraulic chamber is connected to a first brake pipe in the brake system and a second brake pipe in the brake system, the first brake pipe is used to provide a braking force for a first group of brake wheel cylinders in the brake system, the second brake pipe is used to provide a braking force for a second group of brake wheel cylinders in the brake system, the first brake pipe is provided with a first control valve, a closed-open status of the first control valve controls a closed-open status of the first brake pipe, the second brake pipe is provided with a second control valve, and a closed-open status of the second control valve controls a closed-open status of the second brake pipe; and the first hydraulic chamber is connected to the second brake pipe through a third brake pipe in the brake system, the first hydraulic chamber provides a braking force for the second group of brake wheel cylinders through the second brake pipe, and when both the first control valve and the second control valve are in a closed state, the third brake pipe is in communication with the first brake pipe through the second brake pipe, and the first hydraulic chamber provides a braking force for the first group of brake wheel cylinders through the first brake pipe, and a second end of the first control valve is connected to a second end of the second control valve by using a third control valve, and the third control valve controls connection or disconnection between the second end of the second control valve and the second end of the first control valve.

2. The hydraulic adjustment unit according to claim 1, wherein the second hydraulic chamber is connected to a first end of a fourth brake pipe, a second end of the fourth brake pipe is connected to a first end of the second control valve, and an interface between the third brake pipe and the second brake pipe is connected to the second end of the second control valve.

3. The hydraulic adjustment unit according to claim 2, wherein a first one-way valve is disposed between a first interface of the hydraulic adjustment unit and a second interface of the hydraulic adjustment unit, the first interface is an interface between the third brake pipe and the second brake pipe, the second interface is an interface between the third control valve and the second brake pipe, the first one-way valve allows brake fluid to flow from the first interface to the second interface, and the first one-way valve prevents the brake fluid from flowing from the second interface to the first interface.

4. The hydraulic adjustment unit according to claim 2, wherein the fourth brake pipe is provided with a fourth control valve, and closing or opening of the fourth control valve controls closing or opening of the fourth brake pipe.

5. The hydraulic adjustment unit according to claim 4, wherein the third brake pipe is provided with a fifth control valve, and the fifth control valve controls closing or opening of the third brake pipe.

6. The hydraulic adjustment unit according to claim 1, wherein:

- the first hydraulic chamber and the second hydraulic chamber are formed by dividing a hydraulic cylinder in the hydraulic adjustment unit by using a piston in the hydraulic adjustment unit;
- an end portion of the first hydraulic chamber is provided with a push rod support portion, the push rod support portion supports a push rod for driving the piston to move, the push rod support portion is provided with a first hydraulic adjustment port, and the first hydraulic adjustment port is connected to a first outlet pipe of the brake system; and
- the push rod is provided with a second hydraulic adjustment port, the second hydraulic adjustment port is in communication with the first hydraulic chamber, and:
  - when the piston is located at an inner stop point of a piston stroke, the first hydraulic adjustment port is in communication with the second hydraulic adjustment port, and brake fluid in the first hydraulic chamber is discharged from the first hydraulic chamber through the first outlet pipe; or
  - when the piston is located at a position in the piston stroke other than the inner stop point, the first hydraulic adjustment port is not in communication with the second hydraulic adjustment port.

7. The hydraulic adjustment unit according to claim 6, wherein the first hydraulic chamber is connected to a first inlet pipe, and the first inlet pipe is configured to press brake fluid in the hydraulic adjustment unit into the first hydraulic chamber.

8. A brake system, comprising a first group of brake wheel cylinders, a second group of brake wheel cylinders, and a hydraulic adjustment unit, wherein the hydraulic adjustment unit provides a braking force for the first group of brake wheel cylinders through a first brake pipe, and the hydraulic adjustment unit provides a braking force for the second group of brake wheel cylinders through a second brake pipe, wherein the hydraulic adjustment unit comprises:

- a hydraulic adjustment apparatus having a bidirectional pressurization function, wherein the hydraulic adjustment apparatus comprises a first hydraulic chamber and a second hydraulic chamber, wherein:
  - the second hydraulic chamber is connected to a first brake pipe in the brake system and a second brake pipe in the brake system, the first brake pipe is used to provide a braking force for the first group of brake wheel cylinders in the brake system, the second brake pipe is used to provide a braking force for the second group of brake wheel cylinders in the brake system, the first brake pipe is provided with a first control valve, a closed-open status of the first control valve controls a closed-open status of the first brake pipe, the second brake pipe is provided with a second control valve, and a closed-open status of the second control valve controls a closed-open status of the second brake pipe;
  - the first hydraulic chamber is connected to the second brake pipe through a third brake pipe in the brake system, the first hydraulic chamber provides a braking force for the second group of brake wheel cylinders through the second brake pipe, and when both the first control valve and the second control valve are in a closed state, the third brake pipe is in communication with the first brake pipe through the second brake pipe, and the first hydraulic chamber provides a braking force for the first group of brake wheel cylinders through the first brake pipe, and
  - a second end of the first control valve is connected to a second end of the second control valve by using a third control valve, and the third control valve controls connection or disconnection between the second end of the second control valve and the second end of the first control valve.

9. The brake system according to claim 8, wherein the brake system further comprises a driving apparatus, the driving apparatus drives a piston in the hydraulic adjustment apparatus to move along an inner wall of a hydraulic cylinder of the hydraulic adjustment unit, and the piston divides the hydraulic cylinder into the first hydraulic chamber and the second hydraulic chamber.

10. A method for controlling a brake system, wherein the brake system comprises:

- a hydraulic adjustment apparatus having a bidirectional pressurization function, wherein a hydraulic cylinder of the hydraulic adjustment apparatus is divided into a first hydraulic chamber and a second hydraulic chamber by a piston, wherein:
  - the second hydraulic chamber is connected to a first brake pipe in the brake system and a second brake pipe in the brake system, the first brake pipe is used to provide a braking force for a first group of brake wheel cylinders in the brake system, the second brake pipe is used to provide a braking force for a second group of brake wheel cylinders in the brake system, the first brake pipe is provided with a first control valve, a closed-open status of the first control valve controls a closed-open status of the first brake pipe, the second brake pipe is provided with a second control valve, and a closed-open status of the second control valve controls a closed-open status of the second brake pipe;
  - the first hydraulic chamber is connected to the second brake pipe through a third brake pipe in the brake system, the first hydraulic chamber provides a braking force for the second group of brake wheel cylinders through the second brake pipe, and when both the first control valve and the second control valve are in a closed state, the third brake pipe is in communication with the first brake pipe through the second brake pipe, and the first hydraulic chamber provides a braking force for the first group of brake wheel cylinders through the first brake pipe;

a second end of the first control valve is connected to a second end of the second control valve by using a third control valve, and the third control valve controls connection or disconnection between the second end of the second control valve and the second end of the first control valve;

the brake system further comprises a fourth brake pipe, the second hydraulic chamber is connected to a first end of the fourth brake pipe, a second end of the fourth brake pipe is connected to a first end of the second control valve, and the fourth brake pipe is provided with a fourth control valve to control closing or opening of the fourth brake pipe; and the method comprises:

generating, by a controller, a control instruction, wherein the control instruction is used to control a driving apparatus;

sending, by the controller, the control instruction to the driving apparatus, to control the driving apparatus to drive the piston to move along an inner wall of the hydraulic cylinder to increase or decrease pressure of brake fluid in at least one of the first group of brake wheel cylinders or the second group of brake wheel cylinders; and when a braking circuit for providing the braking force for the first group of brake wheel cylinders fails, and the first hydraulic chamber is required to provide the braking force for the second group of brake wheel cylinders, controlling, by the controller, all of the first control valve, the second control valve, and the fourth control valve to be in an open state.

11. The method according to claim 10, wherein the method further comprises:

when the braking circuit for providing the braking force for the first group of brake wheel cylinders fails, and the first hydraulic chamber is required to provide the braking force for the second group of brake wheel cylinders, controlling, by the controller, both the first control valve and the second control valve to be in an open state.

12. The method according to claim 10, wherein:

the third brake pipe is provided with a fifth control valve, and the fifth control valve controls closing or opening of the third brake pipe; and the method further comprises:

when the braking circuit for providing the braking force for the first group of brake wheel cylinders fails, and the first hydraulic chamber is required to provide the braking force for the second group of brake wheel cylinders, controlling, by the controller, both the first control valve and the second control valve to be in an open state and the fifth control valve to be in a closed state.

13. The method according to claim 10, wherein the sending, by the controller, the control instruction to the driving apparatus, to control the driving apparatus to drive the piston to move along an inner wall of the hydraulic cylinder to increase or decrease pressure of brake fluid in at least one of the first group of brake wheel cylinders or the second group of brake wheel cylinders comprises:

in a process of providing the braking force for the second group of brake wheel cylinders, sending, by the controller, the control instruction to the driving apparatus, to control the driving apparatus to drive the piston to compress a volume of the first hydraulic chamber, to press brake fluid in the first hydraulic chamber into the second group of brake wheel cylinders through the second brake pipe, to increase the pressure of the brake fluid in the second group of brake wheel cylinders.

14. The method according to claim 10, wherein the method further comprises:

when the braking circuit for providing the braking force for the first group of brake wheel cylinders fails, and the second hydraulic chamber is required to provide the braking force for the second group of brake wheel cylinders, controlling, by the controller, the first control valve to be in an open state and controlling the second control valve to be in a closed state.

15. The method according to claim 10, wherein:

the brake system further comprises a fourth brake pipe, the second hydraulic chamber is connected to a first end of the fourth brake pipe, a second end of the fourth brake pipe is connected to a first end of the second control valve, and the fourth brake pipe is provided with a fourth control valve to control closing or opening of the fourth brake pipe; and the method further comprises:

when the braking circuit for providing the braking force for the first group of brake wheel cylinders fails, and the second hydraulic chamber is required to provide the braking force for the second group of brake wheel cylinders, controlling, by the controller, the first control valve to be in an open state and controlling the second control valve and the fourth control valve to be in a closed state.

16. The method according to claim 10, wherein:

the third brake pipe is provided with a fifth control valve, and the fifth control valve controls closing or opening of the third brake pipe; and the method further comprises:

when the braking circuit for providing the braking force for the first group of brake wheel cylinders fails, and the second hydraulic chamber is required to provide the braking force for the second group of brake wheel cylinders, controlling, by the controller, the first control valve and the fifth control valve to be in an open state and the second control valve to be in a closed state.

17. The method according to claim 13, wherein the sending, by the controller, the control instruction to the driving apparatus, to control the driving apparatus to drive the piston to move along an inner wall of the hydraulic cylinder, to increase or decrease pressure of brake fluid in at least one of the first group of brake wheel cylinders or the second group of brake wheel cylinders comprises:

in a process of providing the braking force for the second group of brake wheel cylinders, sending, by the controller, the control instruction to the driving apparatus, to control the driving apparatus to drive the piston to compress a volume of the second hydraulic chamber, to press brake fluid in the second hydraulic chamber into the second group of brake wheel cylinders through the second brake pipe, to increase the pressure of the brake fluid in the second group of brake wheel cylinders.

18. The method according to claim 10, wherein the method further comprises:

when a braking circuit for providing the braking force for the second group of brake wheel cylinders fails, and the second hydraulic chamber is required to provide the braking force for the first group of brake wheel cylinders, controlling, by the controller, the first control valve to be in a closed state and the second control valve to be in an open state.

* * * * *